United States Patent [19]

Mason et al.

[11] Patent Number: 4,503,499
[45] Date of Patent: Mar. 5, 1985

[54] CONTROLLED WORK FLOW SYSTEM

[75] Inventors: Gary R. Mason, Agoura; Kenneth W. Speaker, Studio City; James L. Macropol, Camarillo, all of Calif.; Robert A. McKie, Rome, N.Y.; Sidney C. Bailin, Washington, D.C.

[73] Assignee: Eaton Corporation, Cleveland, Ohio

[21] Appl. No.: 419,216

[22] Filed: Sep. 14, 1982
(Under 37 CFR 1.47)

[51] Int. Cl.³ .............................................. G06F 15/16
[52] U.S. Cl. ..................................................... 364/200
[58] Field of Search ... 364/200 MS File, 900 MS File, 364/300, 401, 402

[56] References Cited

U.S. PATENT DOCUMENTS 4,032,899 6/1977 Jenny et al. ........................ 364/200
4,318,173 3/1982 Freedman et al. ................. 364/200

*Primary Examiner*—Raulfe B. Zache
*Attorney, Agent, or Firm*—Lane, Aitken & Kananen

[57] ABSTRACT

In a system for controlling the flow of paper work of a multiplicity of documents by a multiplicity of individuals, the documents are stored electronically in the memory of a central data processor and are electronically transmitted to remote processors to be displayed by display devices of terminals connected to the remote processors when the paper work tasks are performed. Schedules of tasks are stored in the memory of the central data processor, each schedule comprising a plurality of data packets and each data packet containing the identification of a document, the task to be performed on the document, the individual who is to perform the task, whether the task has been completed, whether the task must await the completion of a preceding task identified in the data packet in the schedule and, if so, which preceding data packets have tasks which must be first completed. The central data processor processes the data in the data packets of the schedules and transmits the data packets to the remote data processors when the data packets do not await the completion of an uncompleted task of a preceding data packet. When an individual indicates he wishes to perform a task in a packet which has been transmitted to a data processor, the document of the task will be electronically transmitted from the central data processor memory to the remote data processor and be displayed on the cathode ray tube display device of a terminal connected to the remote processor. The individual will then be able to perform his assigned task on the displayed document. When he has completed his task, the document is electronically transmitted back to the memory of the central data processor and an indication is stored in the corresponding data packet of the stored schedules that the task of the data packet has been completed.

16 Claims, 27 Drawing Figures

Microfiche Appendix Included
(9 Microfiche, 538 Pages)

FIG. 3.

| EFFORT TYPE |
|---|
| EFFORT IDENTIFICATION |
| EFFORT MANAGER IDENTIFICATION |
| EVENT NUMBER |
| STATUS FLAGS |
| USER IDENTIFICATION |
| ACTION |
| DOCUMENT NAME |
| DOCUMENT TYPE |
| ESTIMATED NUMBER OF DAYS |
| TIME DISPATCHED |
| TIME SELECTED |
| TIME COMPLETED |
| EVENTS-WAITED-FOR |
| FORM FIELDS |
| COMMENT |

FIG. 4.

| EFFORT IDENTIFICATION |
|---|
| EFFORT TYPE |
| COLLECTION PENDING COUNT |
| POINTER TO EFFORT RO FILE |
| EFFNEXT |
| EFFMAX |
| FLAGS |

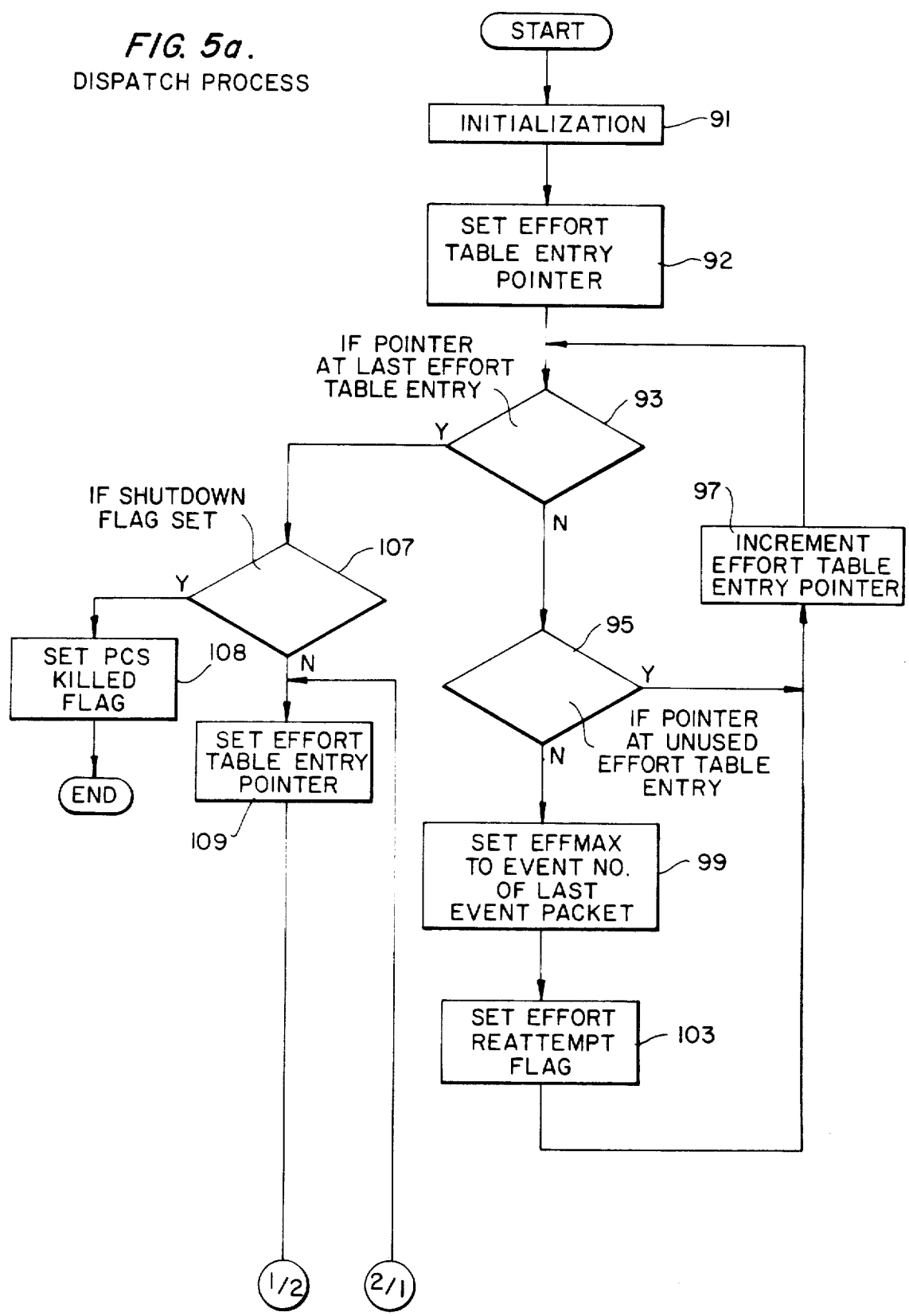

REQUEST MONITOR PROCESS

CHECK EVENTS-WAITED FOR STATUS

SELECT SERVER SUBPROCESS

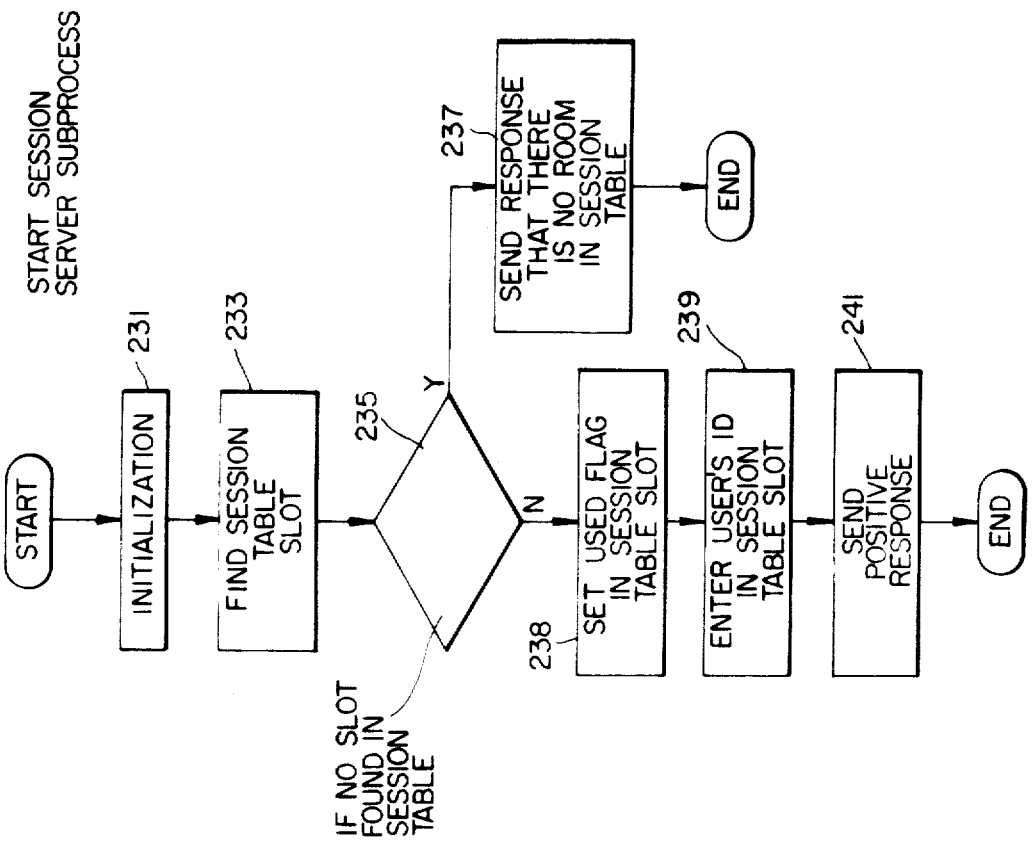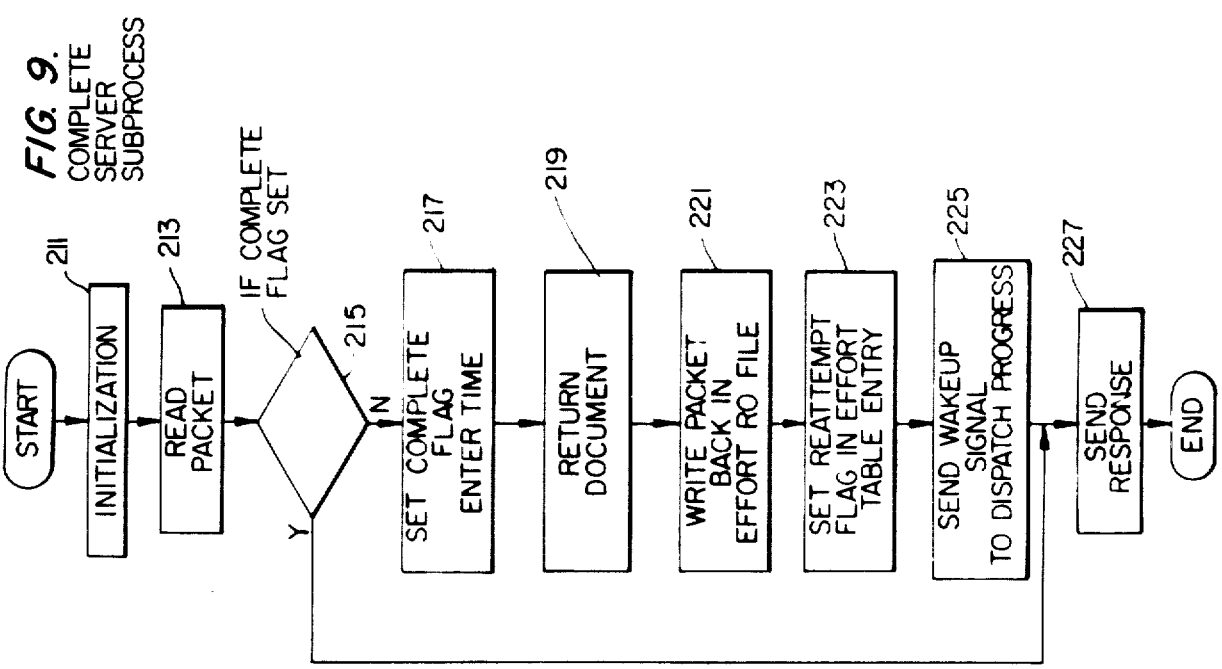

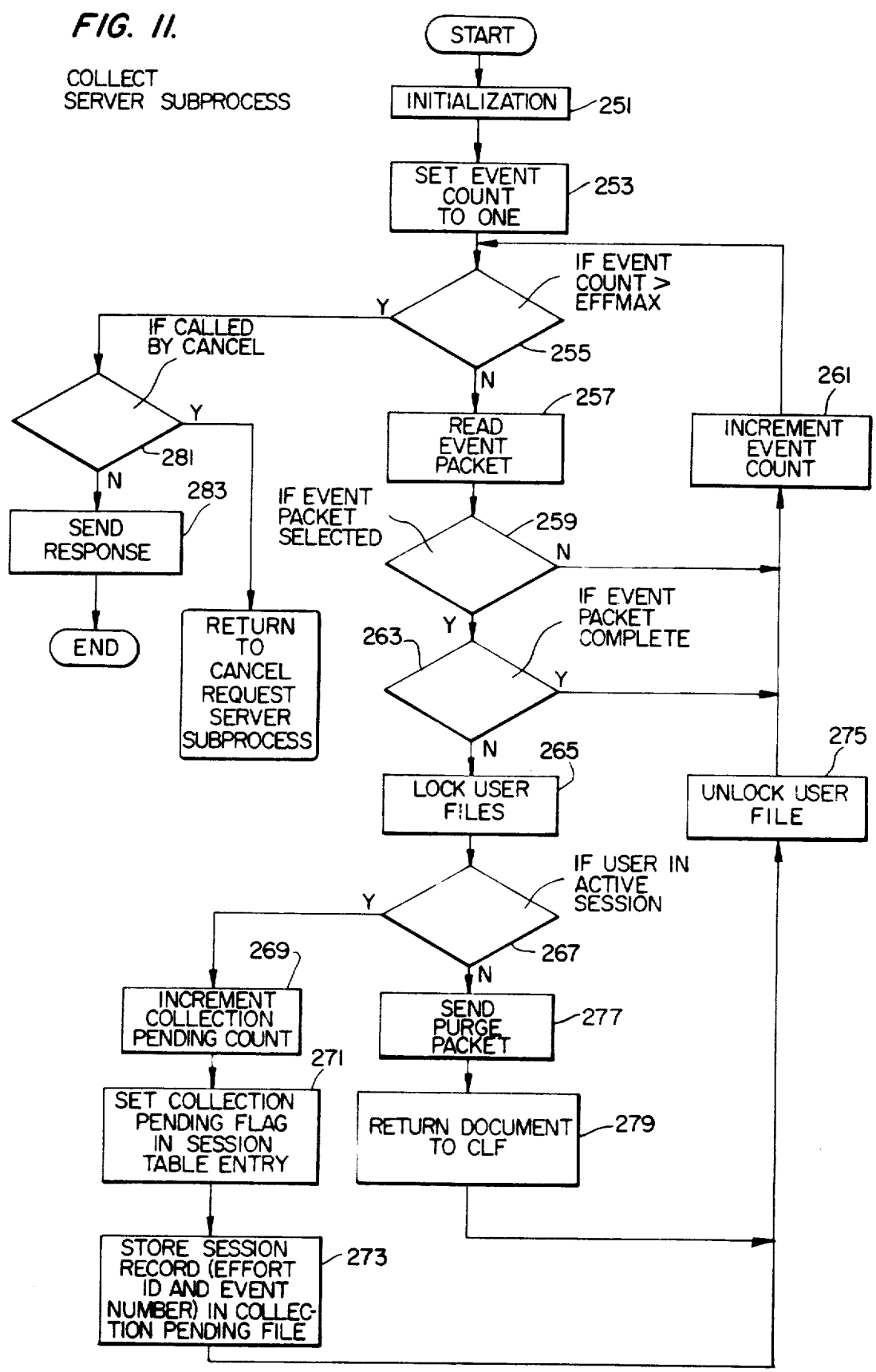

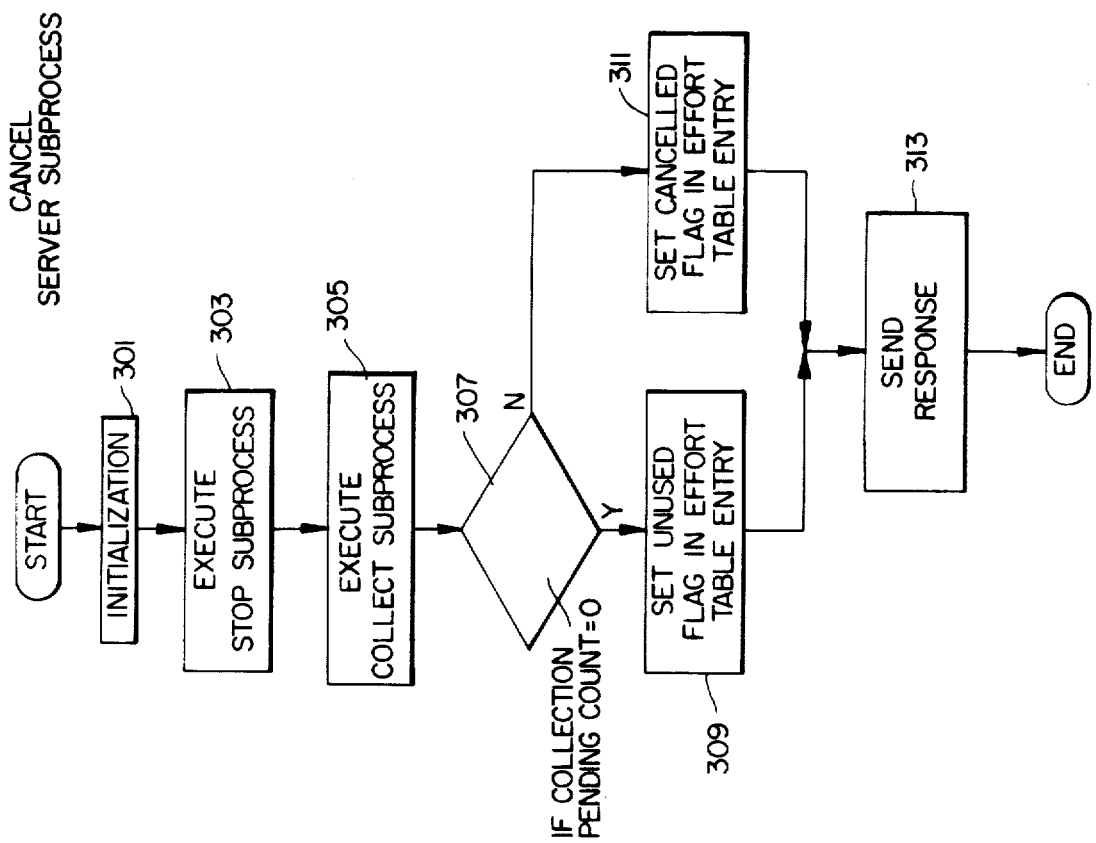
FIG. 13. CANCEL SERVER SUBPROCESS
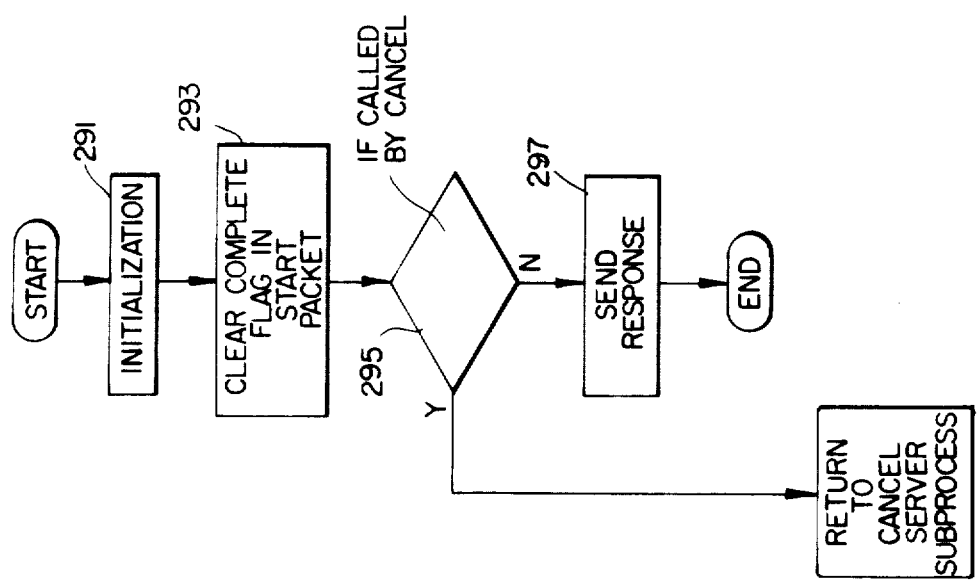
FIG. 12. STOP SERVER SUBPROCESS

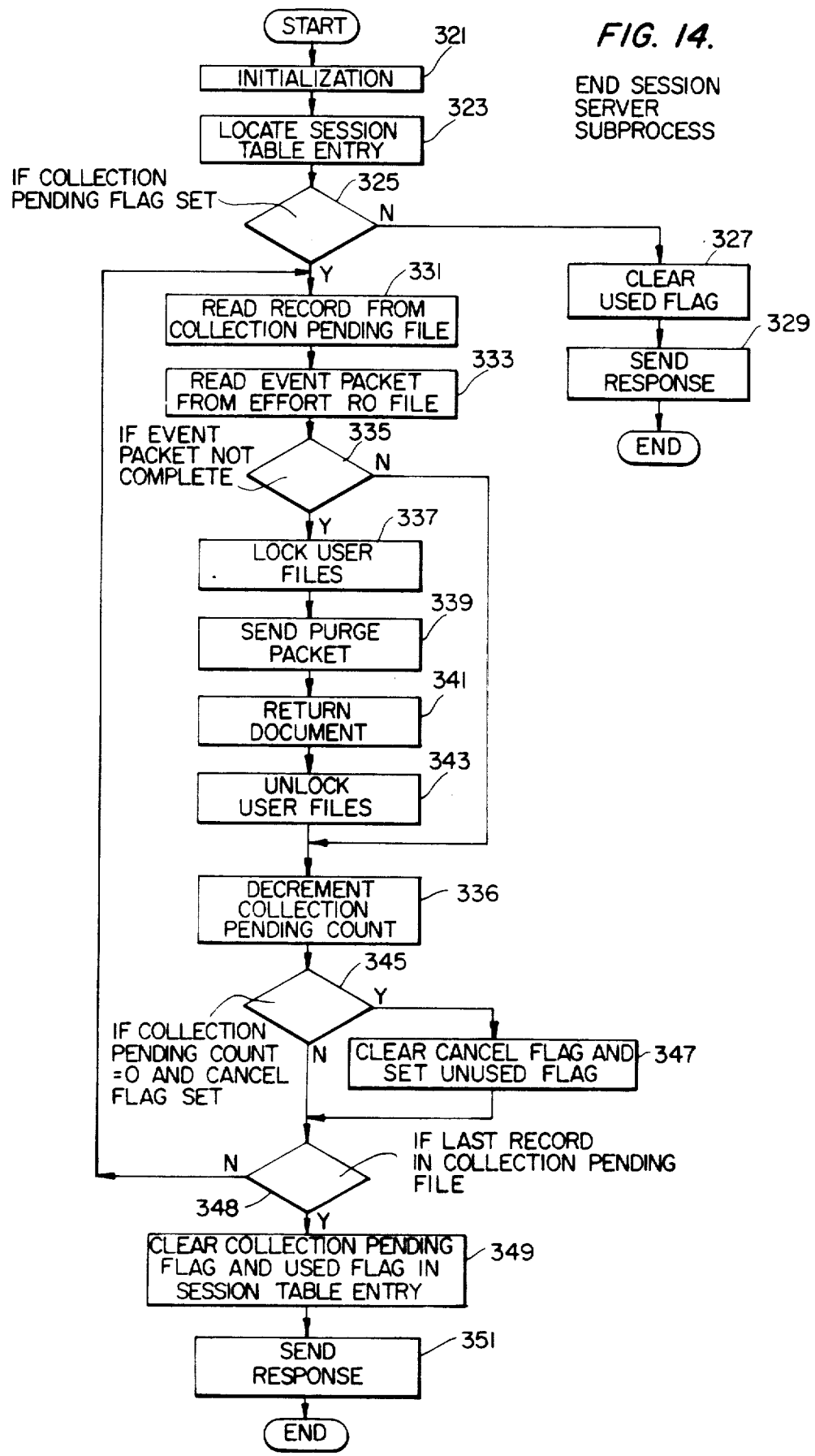

TRACE SERVER SUBPROCESS

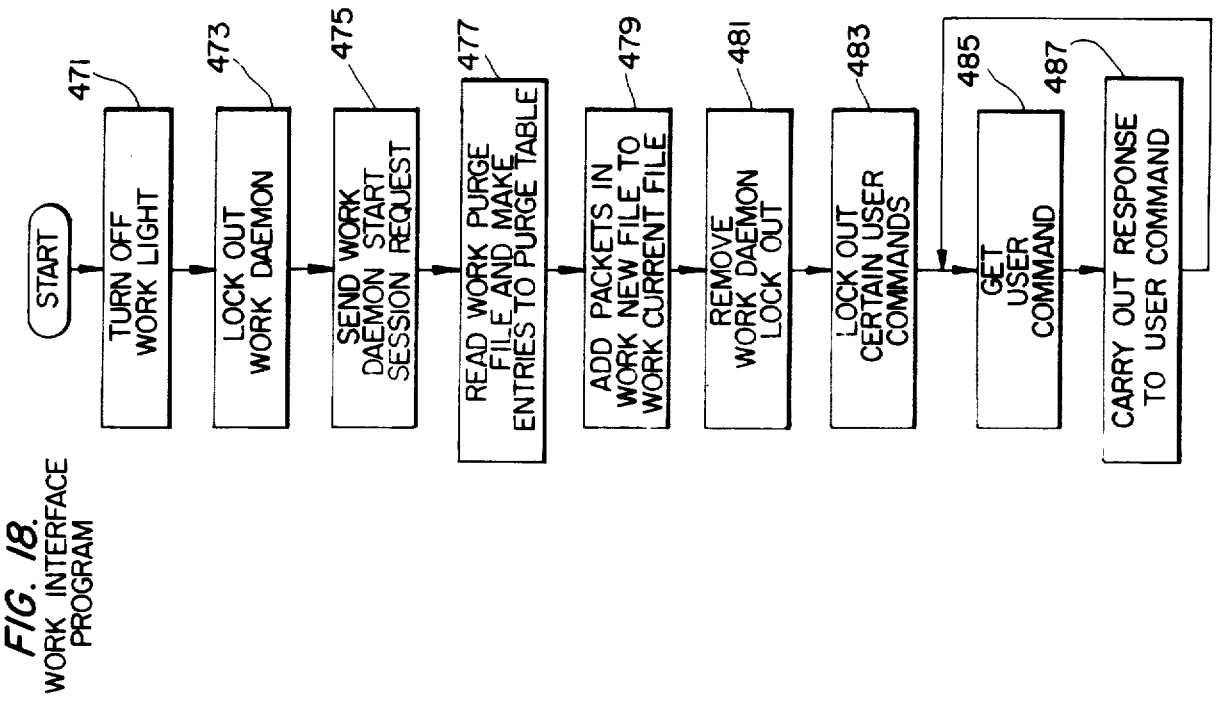
FIG. 18. WORK INTERFACE PROGRAM
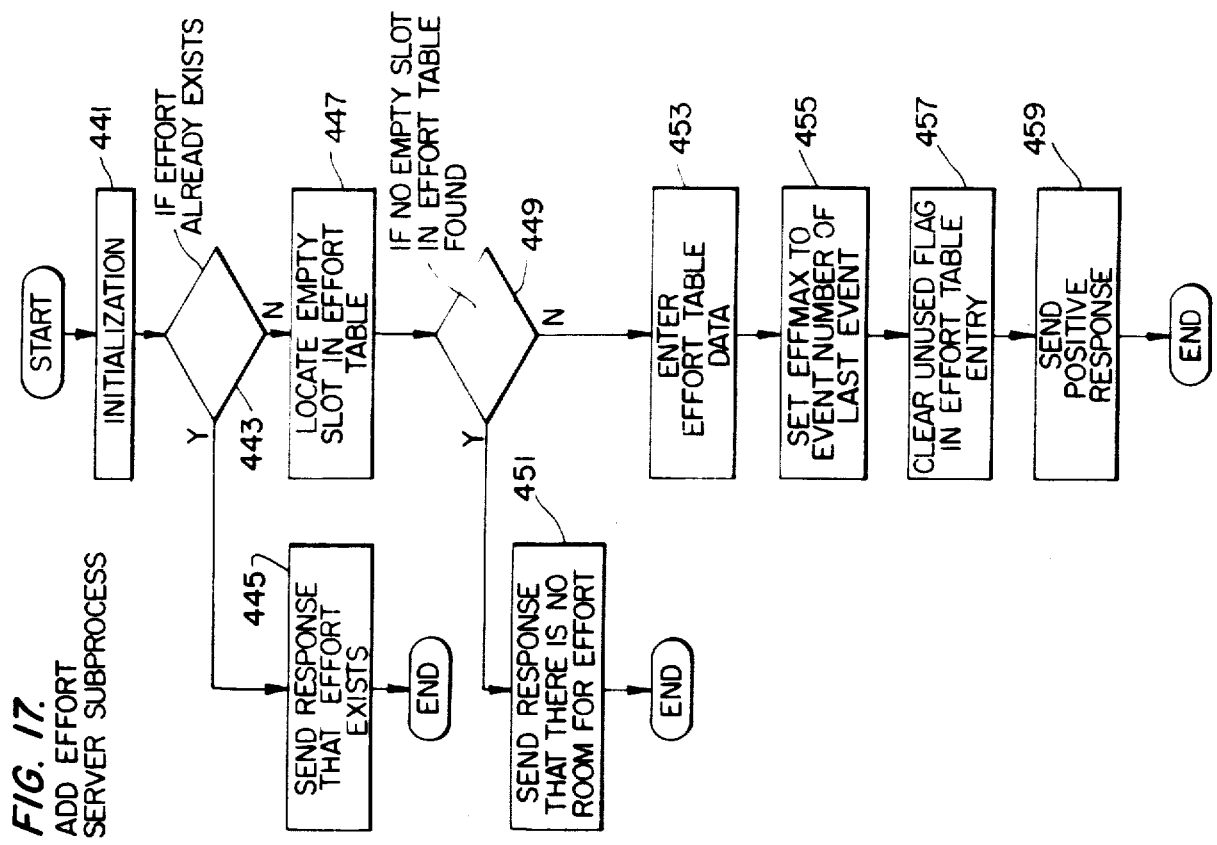
FIG. 17. ADD EFFORT SERVER SUBPROCESS

WORK INTERFACE PROGRAM RESPONSE TO COMMAND LIST

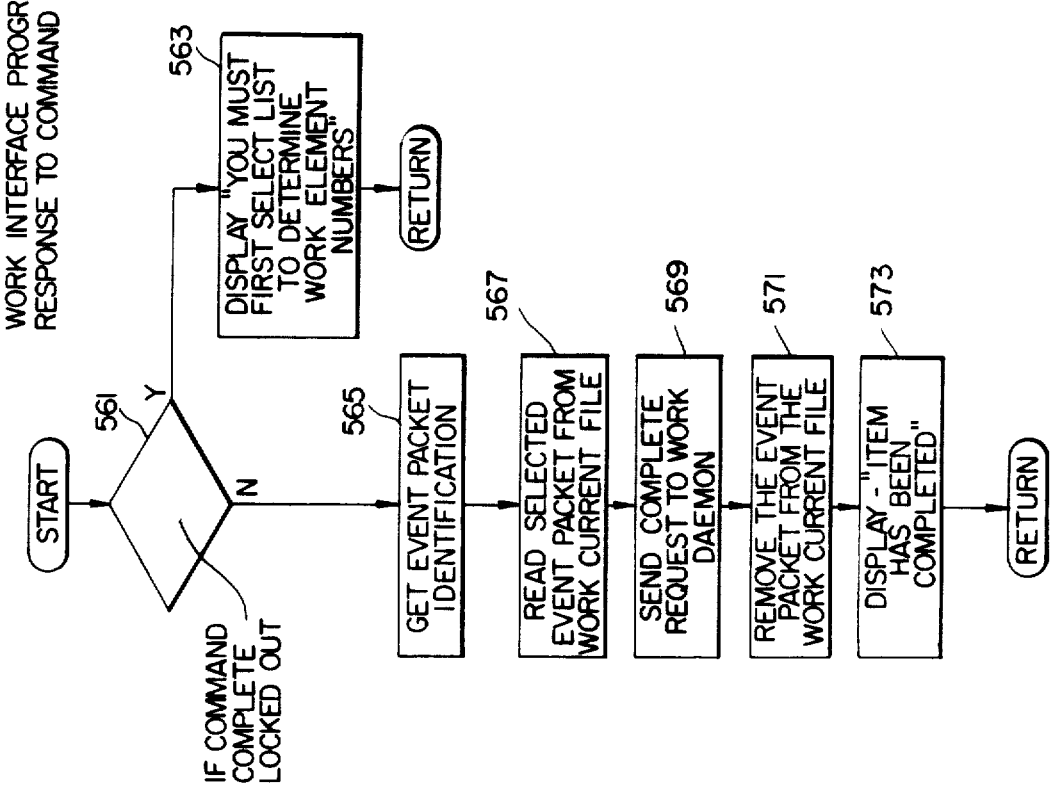
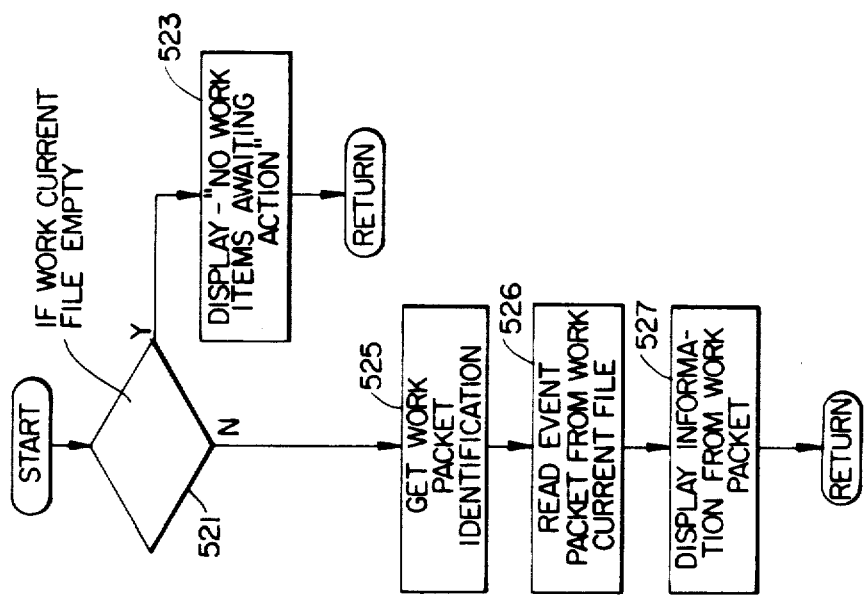

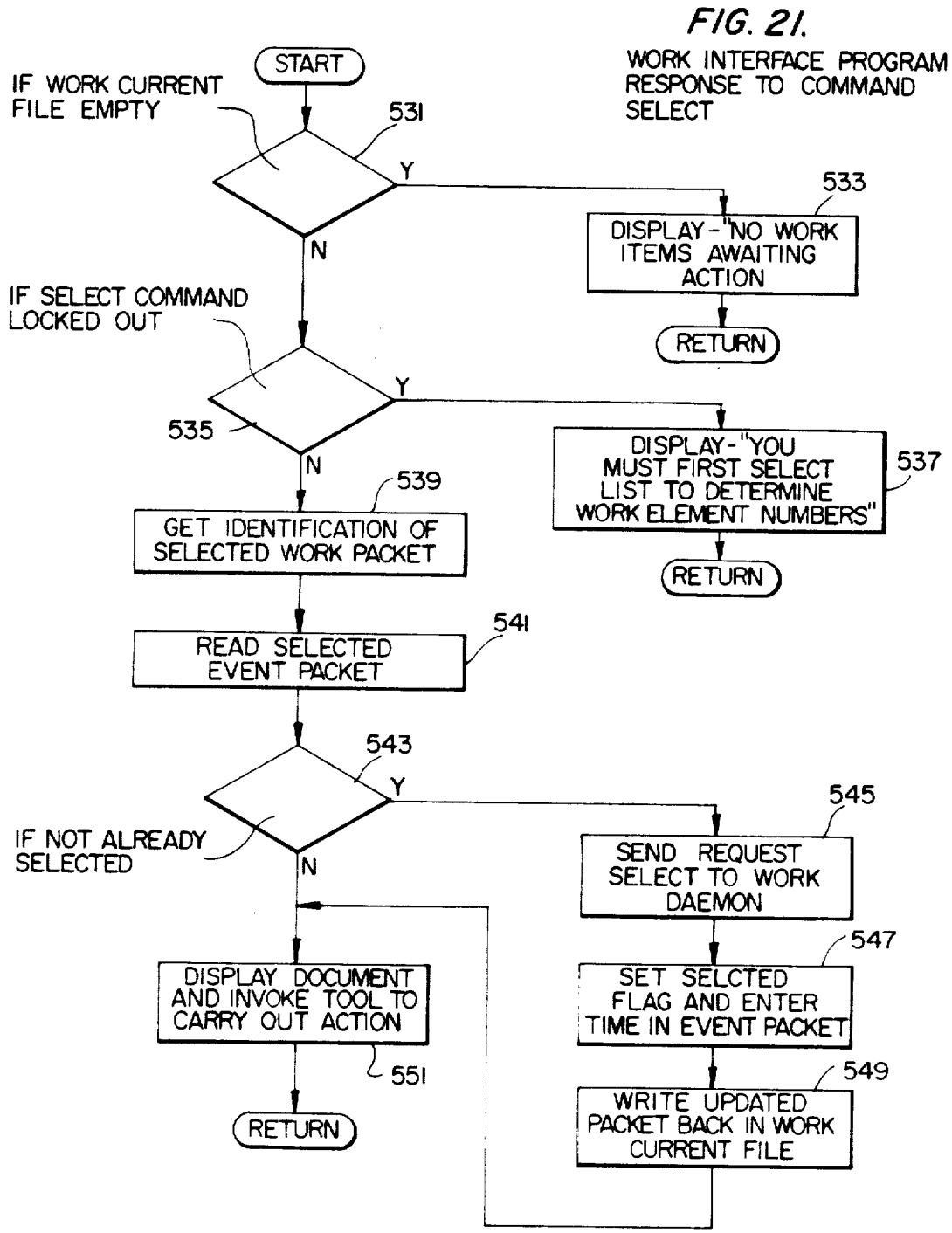

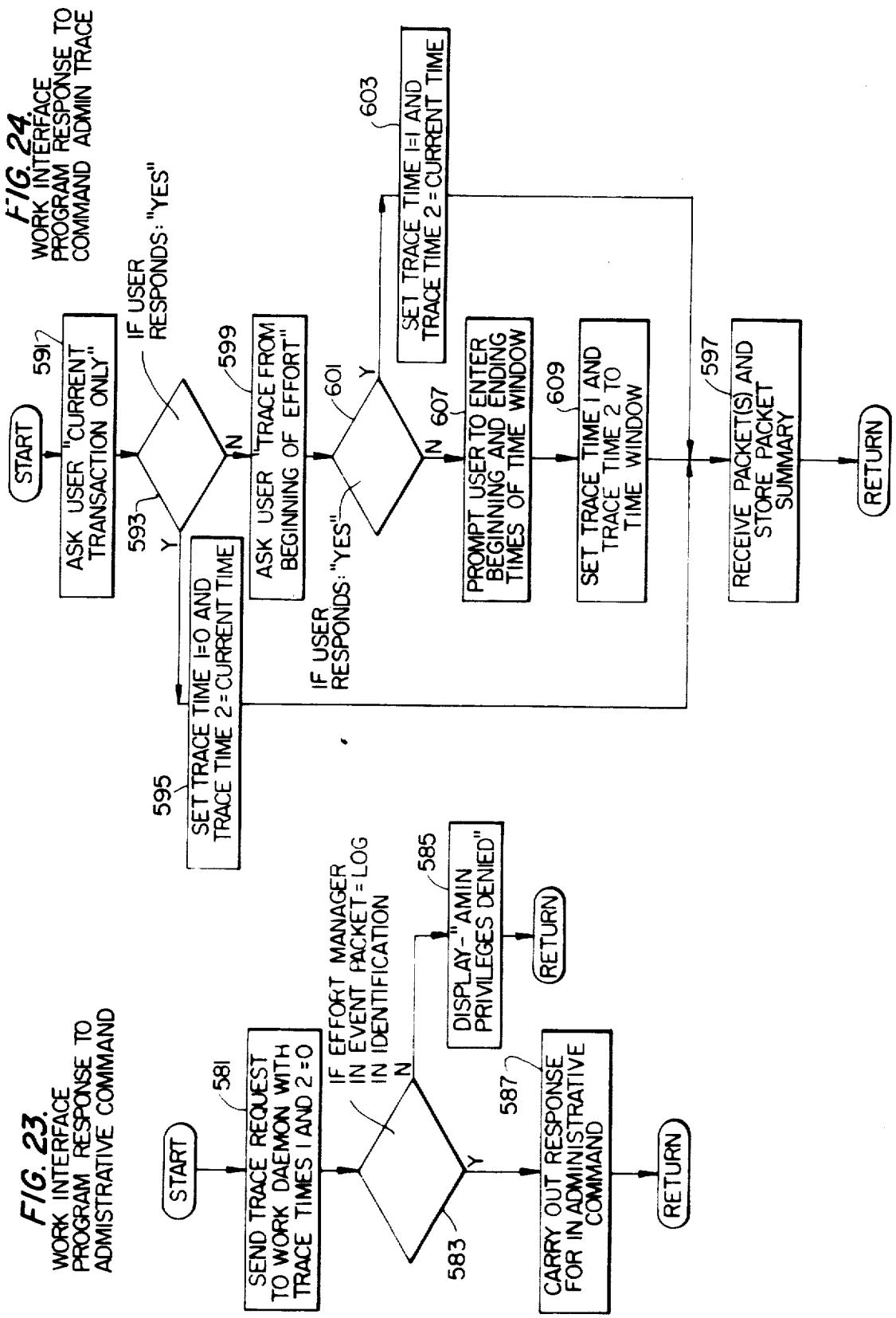

CONTROLLED WORK FLOW SYSTEM

REFERENCE TO MICROFICHE APPENDIX

This invention makes use of a computer program, the source code listings of which are found in the microfiche appendix submitted herewith. The microfiche appendix comprises 9 microfiche totalling 538 microfiche frames.

BACKGROUND OF THE INVENTION

This invention relates to a data processing system for improving the management of work performed by a large number of workers carrying out related interdependent tasks and, more particularly, to a system for automating office procedure to coordinate the flow of work on documents and the transmittal of documents between office personnel.

One source of inefficiency in office work of the type involving preparation, editing documents, filling in forms, etc. arises when a large number of documents relating to a given project have to be worked on by a large number of different people with different people being required to work on common documents and some of the tasks to be performed by some of the personnel having to await the completion of tasks performed by other personnel. When one person does not perform a task on a given document within a reasonable time, this can cause a bottleneck holding up the entire project. In addition, delays in the project tend to occur as a result of misrouting of documents and failure to promptly notify persons who have a given task to perform that the task is ready to be performed, particularly when such task has to await completion of other previous tasks. These problems are exacerbated because information as to the existence of a delay or bottleneck or its cause is not readily available to the project manager and further delays occur before he is informed of a problem and can take corrective action.

SUMMARY OF THE INVENTION

The present invention employs data processing techniques to avoid the above described inefficiencies. In accordance with the present invention, a central data processor is connected to a plurality of remote data processors by means of a communications network. A plurality of terminals are connected to each remote data processor and comprises a keyboard and a cathode ray tube display device. Each terminal respresents the place where one or more individuals will perform the desired paperwork and documentary tasks by means of the keyboard and the cathode ray tube display device. Alternatively, some or all of the terminals may each have its own individual remote data processor connected to the communications network. The documents that are created or worked on by the system of the invention are electronically stored in a memory of the central data processor.

In accordance with the present invention, the paperwork to be performed with respect to a given project is divided into individual tasks each performed by one individual on one document. A file is created in the memory of the central processor for each project containing the schedule of tasks to be performed in the project, identifying the persons who are to perform the tasks, the identification of the documents on which the tasks are to be performed, and an identification of what other tasks have to be completed before each task can be started. A program is executed by the central data processor to operate on the files in the central processor memory containing the scheduled tasks and notifies the workers who are to perform the tasks when the tasks are ready to be performed. The program, in response to requests from the workers, causes the central processor to electronically send the necessary documents to the remote processor where the persons who are to perform the tasks are located.

The system is designed for projects in which some tasks of the project have to await completion of one or more other tasks in the project. The program at the central processor keeps track of the project by storing in the schedule file an indication of which tasks are completed as notified by the workers. When the central processor receives notification that a given task is complete, and other tasks are awaiting completion of the given task, the program sends out notification to the persons who are assigned these other tasks that these other tasks are now ready to be performed. The manager of the project may check on the progress of the project by causing the program executed by the central data processor to examine the schedule file and return information as to the status of the individual tasks of the project.

BRIEF DESCRIPTION OF THE DRAWINGS

FIG. 3 illustrates the organization of a portion of the data file shown in FIG. 2, which portion is called an event packet;

FIG. 4 illustrates the organization of an entry in a table, called the effort table, employed in the system of the present invention and stored in a computer memory of the system of FIG. 1;

FIGS. 5a and 5b show a flow chart of a computer program process, called the dispatch process, employed in the system of the present invention;

FIG. 9 is a flow chart of a computer program subprocess, called a complete server subprocess, which is initiated by the request monitor process shown in FIG. 7;

FIG. 10 is a flow chart illustrating a computer program subprocess, called the start session server subprocess, which is initiated by the request monitor process shown in FIG. 7;

FIG. 11 is a flow chart illustrating a computer program subprocess, called the collect server subprocess, which is initiated by the request monitor process shown in FIG. 7;

FIG. 12 is a flow chart illustrating a computer program subprocess, called the stop server subprocess, which is initiated by the request monitor process of FIG. 7;

FIG. 13 is a flow chart illustrating a computer program subprocess, called the cancel server subprocess, which is initiated by the request monitor process of FIG. 7;

FIG. 14 is a flow chart illustrating a computer program subprocess, called the end session server subprocess, which is initiated by the request monitor process shown in FIG. 7;

FIG. 17 is a flow chart of a computer program subprocess, called the add effort server subprocess, which is initiated by the request monitor process of FIG. 7;

FIG. 18 is a flow chart of a computer program, called the work interface program, employed in the system of the present invention as shown in FIG. 1;

FIG. 20 is a flow chart of a computer subroutine forming part of the work interface program of FIG. 18 carried out in response to a keyboard entered command of SHOW;

FIG. 21 is a flow chart of a subroutine of the work interface program of FIG. 18 carried out in response to the keyboard entered command SELECT;

FIG. 22 is a flow chart of a subroutine of the work interface program of FIG. 18 carried out in response to the keyboard entered command COMPLETE;

FIG. 23 is a subroutine forming part of the work interface program of FIG. 18 carried out in response to a keyboard entered administrative type command;

FIG. 24 is a flow chart illustrating a computer program subroutine forming part of the subroutine of FIG. 22 and carried out in response to the keyboard entered command ADMIN TRACE.

DESCRIPTION OF A SPECIFIC EMBODIMENT

Figure 1:
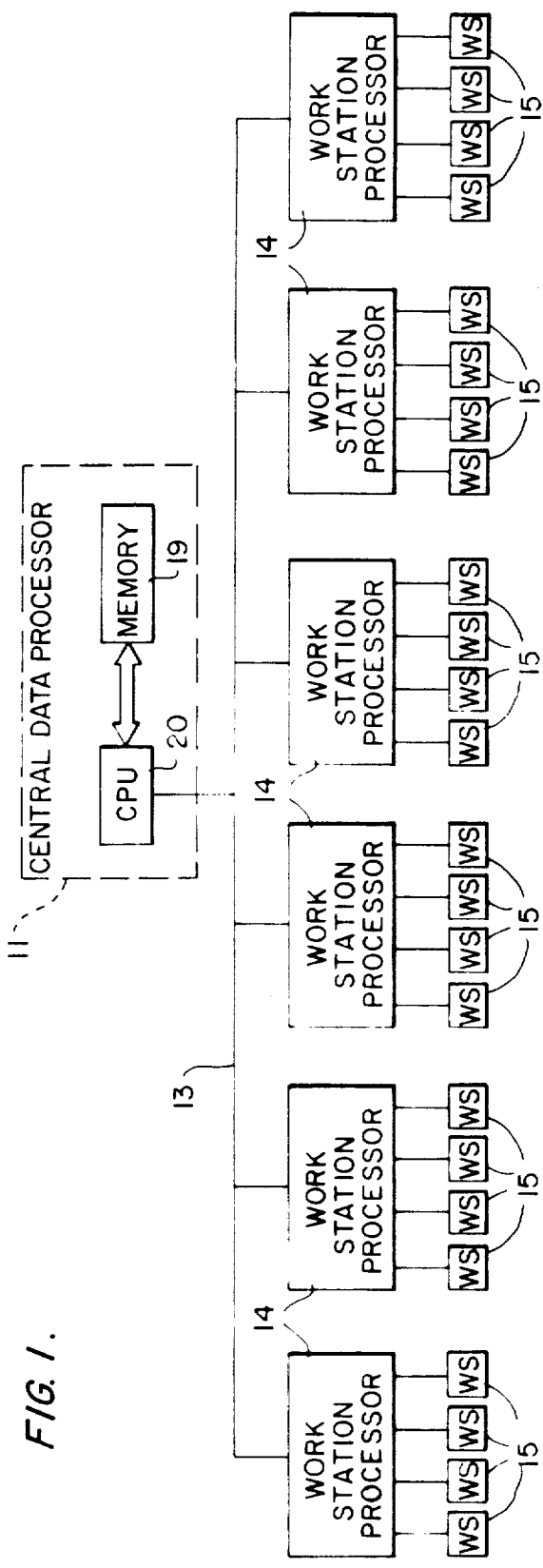
FIG. 1 is a block diagram illustrating the hardware or architecture of the overall system of the present invention.
Figure 1A:
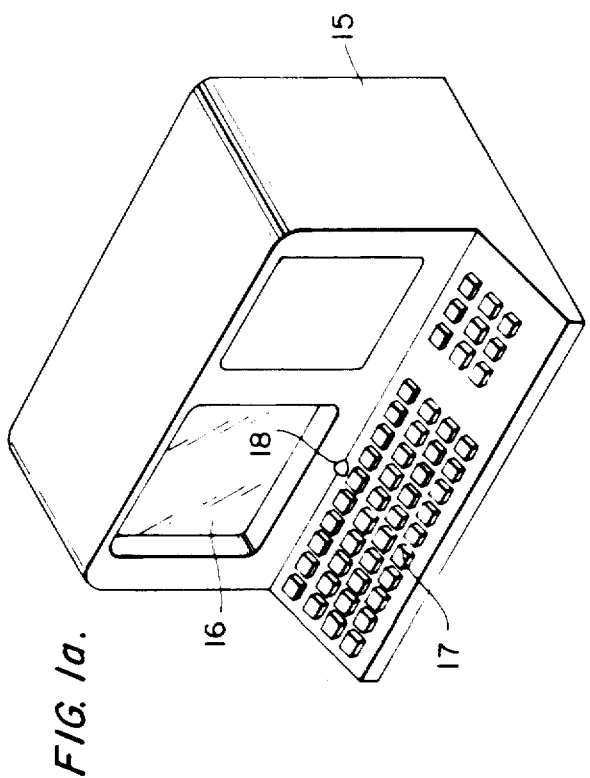
FIG. 1a illustrates a computer terminal, called a work station, employed in the system of FIG. 1.

As shown in FIG. 1, the system of the present invention comprises a central data processor 11, which is connected by a communications network 13 to a plurality of remote data processors 14, which are called "work station processors". Each work station data processor has a plurality of terminals called "work stations" connected thereto. Each work station, as shown in FIG. 1a, comprises a keyboard 17 for entering data and commands into the corresponding remote processor 14 and a cathode ray tube display device 16 operated by the corresponding remote processor for displaying documents and data in the memory of the remote processor. The keyboard is provided with at least one signal lamp 18, called the "work light".

The central data processor 11 comprises a CPU 20 which executes programs of the controlled work flow system of the present invention and which has a memory 19 to store files associated with the controlled work flow system. The central data processor 11 is provided with a central library facility to store and access documents of the controlled work flow system. The central library facility has a library memory comprising a portion of the memory 19 to store the documents and a program for accessing the documents called the CLF daemon. The CLF daemon will access the documents in the library memory and send documents to or fetch documents from a selected work station processor over the communications network 13. For example, in response to a request, which is referred to as BORROW, identifying a specific document stored in the central library facility, the central library facility will read out the identified document from the library memory and send it to a work station processor. The documents received by a work station processor are stored in a portion of the memory of the work station processor, called the "document directory". The request BORROW will identify the document directory in a particular work station processor to which the document is to be sent and the central library facility will electronically transmit the document to the remote processor and store it in this document directory. A document sent to a work station processor in response to a BORROW request is said to be "borrowed". A work station connected to the work station processor receiving the borrowed document can then modify the borrowed document. In response to a request, which is referred to as RETURN, the central library facility will fetch the borrowed document from the document directory identified with the RETURN request and store the document back in the document file for the document in the library memory in the form as modified by the work station. If a newly created document is to be stored in the central library facility memory, the document is fetched by the central library facility in response to a request, which is referred to as STORE. In response to receiving a STORE request, the central library facility will store the document in a new document file set up for the document in the central library facility memory.

When a document is borrowed from the central library facility, the central library facility retains a copy of the document, but the central library facility will not respond positively to a request to borrow a document which is already borrowed. The central library facility will also respond to a request, referred to as COPY, and identifying a document in the central library facility. In response to receiving the request COPY, the central library facility will read out the identified document and store it in a special document directory at the work station processor identified with the COPY request. The central library facility, however, will only respond positively to a RETURN request if the document has been borrowed and, accordingly, only a borrowed document can be modified and returned to the central library facility.[1]

[1] The source code listing for the CLF daemon is found in frames 386 through 401 of the microfiche appendix.

In the controlled work flow process, the scheduling of work tasks in a project is controlled by the program executed by the data processor 11, which program is called the "work daemon". Each paperwork project involving a multiplicity of documents and a multiplicity of personnel to work on the documents is referred to as an "effort" and files referred to as effort RO files, each designating the schedule of paperwork for a given effort, are stored in the memory 19. Each effort is broken down into tasks with each task to be performed by one individual worker on one document. These tasks are called "work events". The individual workers and managers who make use of the controlled work flow system are called "users". The work daemon operates on the effort RO files to notify the users at the work stations 15 what work events are ready to be carried out and issues BORROW, RETURN, STORE, and COPY requests to the central library facility to transmit documents between the work station processors and the central library facility. When a user indicates that he wishes to proceed with a specified work event, which involves modification of an existing document, the work daemon will issue a BORROW request to the central library facility to cause the document of the work event to be sent to the work station processor corresponding to the user for the work event. When a user indicates that he has completed a work event on a borrowed or newly created document, the work daemon will issue a RETURN or STORE request to the central library facility and cause the document, as modified, to be sent back to the central library facility for storage back in the library memory. In a given effort, some of the work events may have to await completion of tasks by other individuals. In such instances, the work daemon awaits the completion of the necessary previous work event or events and, then on completion of these previous events, sends notification to the user at the work station that the specific work event is now ready for the user to perform.

At each work station processor, a work interface program is provided to organize the information received from the work daemon. The work interface program also responds to commands from the user entered by the keyboard at a work station to transmit requests to the work daemon, displays the documents received from the CLF daemon in response to operations of the work daemon, and enables the user to carry out the tasks of his assigned work events.

An effort manager will be named to be in charge of each effort and an effort manager will usually have the responsibility for setting up the schedule of work events in a work effort. This schedule is called a "route specification" and each effort RO file is generated from the information in a route specification. To generate a route specification, the effort manager makes use of a program called the "effort program" in which he enters the data of a route specification into the computer system by means of one of the work stations 15. The effort program is preferably resident at each of the remote processors 14. The data will go first into a route specification file and, from the route specification file, it will be compiled into an effort RO file and stored in the memory 19.[2]

[2] The source code listing for the effort program is found in frames 119 to 123 in the microfiche appendix.

To make the route specification file, the effort manager first breaks the effort down into work events and may separate the work events into one or more groups of logically related work events, which groups are called "steps". Then, using the effort program, the effort manager enters the data of a route specification by first entering a unique name for the effort followed by his own identification and an identification of the type or classification in which the effort falls. The effort manager will then enter the appropriate data for each work event of the effort including: (1) the identification of the person who will carry out the task of the work event; (2) an identification of the task to be perfomed; (3) the document name which uniquely identifies the document in the effort; (4) the type of document, such as, for example, form, text or drawing; (5) the estimated days required to complete the event; (6) in the case of forms, the identification of the fields of the form which are to be acted upon by the user who is assigned the task of the event; and (7) an identification of each preceeding event which must be completed before the given event can proceed. The effort manager may include a label uniquely identifying each event within the effort at the beginning of each event. A unique identifying label should be entered for each event which requires completion before another event of the effort can be undertaken. The task to be performed in each event will be limited to a predetermined set of actions which, for example, may be CREATE, UPDATE, SIGN, COMMENT and EXAMINE. When the action is CREATE, this means that the document of the event is to be created by the user. If the action is UPDATE, this means that the document exists and is to be updated or edited by the user of the event. If the action to be taken is SIGN, then the user of the event is to signify an electronic signature to the document indicating his approval of the document or specified portion of the document. If the action is COMMENT, then the user for the event is to enter his comments regarding the document in a special comments file associated with the effort. If the action is EXAMINE, the user of the event is to merely examine the document. The effort manager may include with each event any comment or instruction to the user who is to carry out the task of the event.

An example of a route specification file is shown below:

| effort proj848 acm,acquisition | |
|---|---|
| make event | who = acm |
| | action = create |
| | docname = form77 |
| | doctype = form |
| | takes = 2 |
| | fields = 1, 3, 4, 5, 7, 8, 9, 22, 23, 25, 34: |
| make1 event | who = jmmj |
| | action = update |
| | docname = frm77 |
| | doctype = form |
| | takes = 1 |
| | fields = 2, 6, 11 |
| | waitfor = make |
| sowc event | who = acm |
| | action = create |
| | docname = SOW |
| | doctype = text |
| | takes = 40 |
| make2 event | who = lrpb |
| | action = update |
| | docname = form77 |
| | doctype = form |
| | takes = 1 |
| | fields = 12 |
| | waitfor = make1 |
| f77 event | who = cmndr |
| | action = sign |
| | docname = form |
| | takes = 1 |
| | fields = 14 |
| | waitfor = make2 |
| event | who = acm |
| | action = create |
| | docname = form191 |
| | doctype = form |
| | takes = 1 |
| | fields = 1, 2, 3, 4, 5, 6, 7, 8, 9 |
| | waitfor = f77 |
| | comment = cant proceed until form 77 is signed. |
| event | who = rlk |
| | action = update |
| | docname = SOW |
| | doctype = text |
| | takes = 14 |

-continued

```
effort proj848 acm,acquisition
waitfor = sowc
```

In the above route specification file, the name of the effort is PROJ 848. The effort manager's identification is ACM. The type of effort is ACQUISITION meaning that effort is the paperwork for a procurement project. Another type of effort, for example, might be TRIP/-TRAVEL meaning that effort is the paperwork associated with a trip authorization or a trip report. In the example, there are seven events. The first five events are given the labels make, make1, sowc, make2 and f77. The sixth and seventh events are unlabeled. The user, to carry out the task in each event, is identified opposite "who=". The task to be carried out is identified opposite "action=". The name of the document for each event is identified opposite the "docname=". The type of document for the event is identified opposite "doctype=". The number of days estimated to carry out the task of the event is identified opposite "takes=". When a document is a form, the identification of fields of the form to be filled in by the user for the event are identified opposite "fields". Those events which must wait for the completion of a preceding event or events, identify the preceding event or events opposite "wait for=". Thus, before the event make1 can be undertaken, the event make must be completed; before the event make2 can be undertaken, the event make1 must be completed; before the event f77 can be undertaken, the event make2 must be completed; before the penultimate event of the effort (unlabeled) can be undertaken, the event f77 must be completed; and before the last event of the effort (unlabeled) can be undertaken, the event identified sowc must be completed. The effort manager has included with the penultimate event the comment "cant proceed until form 77 is signed."

Figure 2:
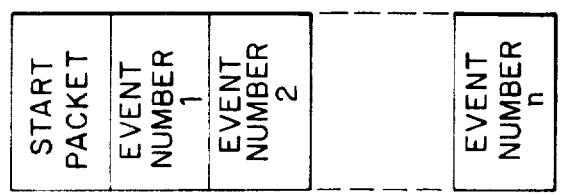
FIG. 2 illustrates a data file, called an effort RO file, employed in the system of the invention, and stored in a computer memory of the system of FIG. 1.

After the effort manager has created a route specification file, as described above, for a given effort, he will then use a program called the "route compiler" to cause the effort to be compiled into an effort RO file, which will be transmitted to the central processor and stored in the memory 19 of the central data processor 11.[3] Each effort RO file has essentially the same information as in the route specification file, but converted to a form to be processed by the work daemon. As shown in FIG. 2, which illustrates the organization of an effort RO file, each effort RO file begins with a start packet containing the effort name, the effort type, the event number "0", and the identification of the effort manager, followed by a status flag, which is used by the work daemon in the management of the effort RO file. The start packet is followed by a series of event packets, each of which contains the information from a corresponding work event in the route specification file.

[3] The source code listing for the route compiler is found in frames 124 to 141 in the microfiche appendix.

As shown in FIG. 3, which illustrates the organization of an event packet in the effort RO file, the entries thereof comprise: (1) the effort type followed by, (2) the effort name, (3) the identification of the effort manager, (4) the event number, which is the number assigned to the event in accordance with its sequential position in the effort RO file, (5) the event status flags, which indicate the present status of the event in the effort, (6) the user identification, which is the identification of the individual to perform the task, (7) the action, which is the task to be performed, (8) the document name, (9) the document type, which may be text form, or graph, (10) the estimated number of days to complete the task of the event. The above entries are found in every event packet at the time that it is included in an effort RO file. Following these entries are the time dispatched, time selected, and time complete sections, which are for entering times indicating the progress of the event in the effort. After the time sections, an "events-waited-for" section is provided to enter identification of those preceeding events which must be first completed before the task of the present event can be undertaken. Following the events-waited-for section is a "form field" section used only when the document type is a form to identify the field or fields in the form to be acted upon by the user. Following the form field section is a section to receive any comment or instruction regarding the event from the effort manager.

As will be explained below, the event packet will be dispatched to a file assigned to the user of the event when the event is ready to be undertaken by the user; that is, when all the preceding events for which the present event must wait will have been completed. The time that the event packet is dispatched is entered in the time dispatched section. The time that the user selects the event packet to begin carrying out the task of the event is inserted in the time selected section and the time that the user indicates that he has completed the task is inserted in the time complete section. The status flags comprise a dispatched flag which is set when the event packet is dispatched, a selected flag which is set when the event is selected, and a complete flag which is set when the user indicates that he has completed the task of the event packet. The status flag in the start packet in each effort RO file is also a complete flag. This complete flag in the start packet must be set in order for the work daemon to dispatch any event packets of the effort. Thus, setting or clearing the flag serves to start or stop the dispatching of events in the effort. As indicated above, the document type may be a text, drawing, or form. If the document type is a form, the document identification will refer to a particular form blank in the repertoire of the forms editor tool, which is operable to display a copy of any selected form blank in its repertoire on the CRT display device of a work station. When a form is stored as a document in the central library facility, the only data stored is the form blank identification and the data filled in each field of the form. When the form is borrowed or copied from the central library facility, this data is transmitted and stored in the document directory in the memory of the work station processor. When a user selects an event packet to begin work on the task of the event packet, the document of the event packet will be displayed on the CRT display of the user. If the document is a form, the forms editor tool, which will automatically be invoked in response to the identification of the document type as a form in the event packet, will paint a copy of the form blank on the screen of the CRT display device and will display the filled in data in the appropriate blanks in accordance with the data in the document borrowed or copied from the central library facility. The effort manager, when he sets up an effort in the effort program, will usually make provision for some of the form fields of each form acted on in the effort to be pre-filled in with data during the effort program. The pre-filled in data will be stored in the central library facility in a document file identified by the effort name and document name given to the form in the effort. In addition, a blank comments document file will be mapped out in the central library facility memory identified by the effort identification and a document name identifying it as the comments file for the effort.

The work daemon program comprises a main process, a request monitor process and a dispatch process, which, preferably, are all operated, in effect, simultaneously with each other and with the CLF daemon. The simultaneous operation of the processes is a feature of the executive or operating program of the central data processor 11. An example of an executive program which operates the program processes simultaneously is the UNIX operating system, which is available from Bell Laboratories. The actual carrying out of the function of the controlled work flow system is effected by the request monitor process and the dispatch process and the program enters into these two processes under the control of the main process.[4] In the dispatch process, the program examines the event packets in each effort RO file to determine whether or not the event packets are ready to be worked on by the user assigned to the event packet. This is done by determining whether or not the complete flag in the start packet has been set and also whether or not the complete flag in each of the preceding event packets identified in the events-waited-for section of the event packet being examined have been set. If the complete flags are set, the dispatch process inserts the time in the time dispatched section or the event packet and sends a copy of the event packet to a file of the user who is assigned the task of the event packet in one of the work station processors. The dispatch process examines the event packets in order and when it reaches one that is not ready to be dispatched, it stops dispatching event packets from that effort RO file and proceeds to another effort RO file. Thus, if the complete flag in the start packet is not set, then no event packet in the corresponding effort RO file will be dispatched. If the complete flag in the start packet is set, then event packets in the corresponding effort RO file which are examined by the dispatch process and which have no entries in their events-waited-for sections will be dispatched to the appropriate work station processors. In addition, event packets examined by the dispatch process and identifying one or more preceding event packets in their events-waited-for sections will be dispatched to the appropriate work station processors if such preceding event packets have their complete flags set.

[4] The source code listing for the main process is found in frames 295 to 302 in the microfiche appendix.

In the request monitor process, the work daemon responds to the requests sent to the central processing system 11 primarily by the work interface programs at the work station processors 14. When the request monitor process receives a request, it will initiate a subprocess to respond to the request and carry out the function corresponding to the request. For example, when a user indicates that he wishes to work on an event packet, the work interface program at a work station processor will transmit a request, called SELECT, to the central processor. In response to receiving the request SELECT, the request monitor process will initiate a subprocess to cause the document of the event packet, if it exists, to be sent from the central library facility to the work station processor associated with the user of the event packet. The request to notify the central processor 11 that the user has completed the work on a given event packet is called COMPLETE. In response to this request, the request monitor will cause the document of the identified event packet to be sent to the central library facility if the document is borrowed or newly created and will set the complete flag in the event packet. Then the dispatch process will dispatch any additional event packets permitted by the setting of the complete flag in the request monitor process.

The subprocesses initiated by the request monitor in response to requests received from the work interface programs are called "request server" subprocesses. The request server subprocesses once initiated by the request monitor process are carried on simultaneously with the request monitor process and the dispatch process so that several request server subprocesses can be carried on simultaneously with each other and with the dispatch process as well as with the program of the CLF daemon.

A table is created and stored in the memory 14 of the central processor called a process table and the entries in the process table correspond to the processes and subprocesses being carried out simultaneously in the controlled work flow system. The first entry in the process table corresponds to the main process and two other entries in the process table correspond to the request monitor process and the dispatch process. In addition, several entries in the process table are set aside for request server subprocesses. Each entry in the process table contains an identification of the process or subprocess and various flags including an ended flag which is set when the process has ended, an unused flag which is set to indicate that the entry in the process table is not used, a wait flag which is set when the process is in a wait state, a server flag which is set to indicate that the slot in the entry table is reserved for a request server subprocess, and a killed flag which is set when the process is being or has been terminated. When the request monitor process initiates a server subprocess, it finds a process table entry with its server flag set indicating that this entry is set aside for a request server subprocess and with its unused flag set. It then clears the unused flag from this process table entry, clears the killed and ended flags if these flags are set, and enters the identification of the request server subprocess in the process table.

A table is provided in the memory 19 called an effort table which is intended to function as a list of all of current effort RO files, that is, the effort RO files which correspond to efforts which the effort manager has added to the system and are actively being carried out or will be carried out in the future. FIG. 4 illustrates the organization of an entry in the effort table. As shown in FIG. 4, each effort table entry is headed by (1) the identification of the effort, followed by (2) the type of effort; (3) the collection pending count, the purpose of which will be explained below; (4) a pointer to a structure defining the effort RO file for the effort (used only by the dispatch process); (5) a number (called EFFNEXT) to identify the event number of the next event packet to be dispatched in the effort RO file; (6) a number (called EFFMAX) to identify the event of the last event packet in the effort RO file; and (7) a set of flags for the effort. The set of flags in the effort table entry include an unused flag which is set when the effort table entry has an active effort listed therein or one which will be made active. This flag is cleared when the effort has been cancelled. There is also a "reattempt flag" which is used in the dispatch process as will be described below and a "canceled flag" which is used in response to a user's request to cancel an effort as will be described below.

DISPATCH PROCESS

Figure 5B:
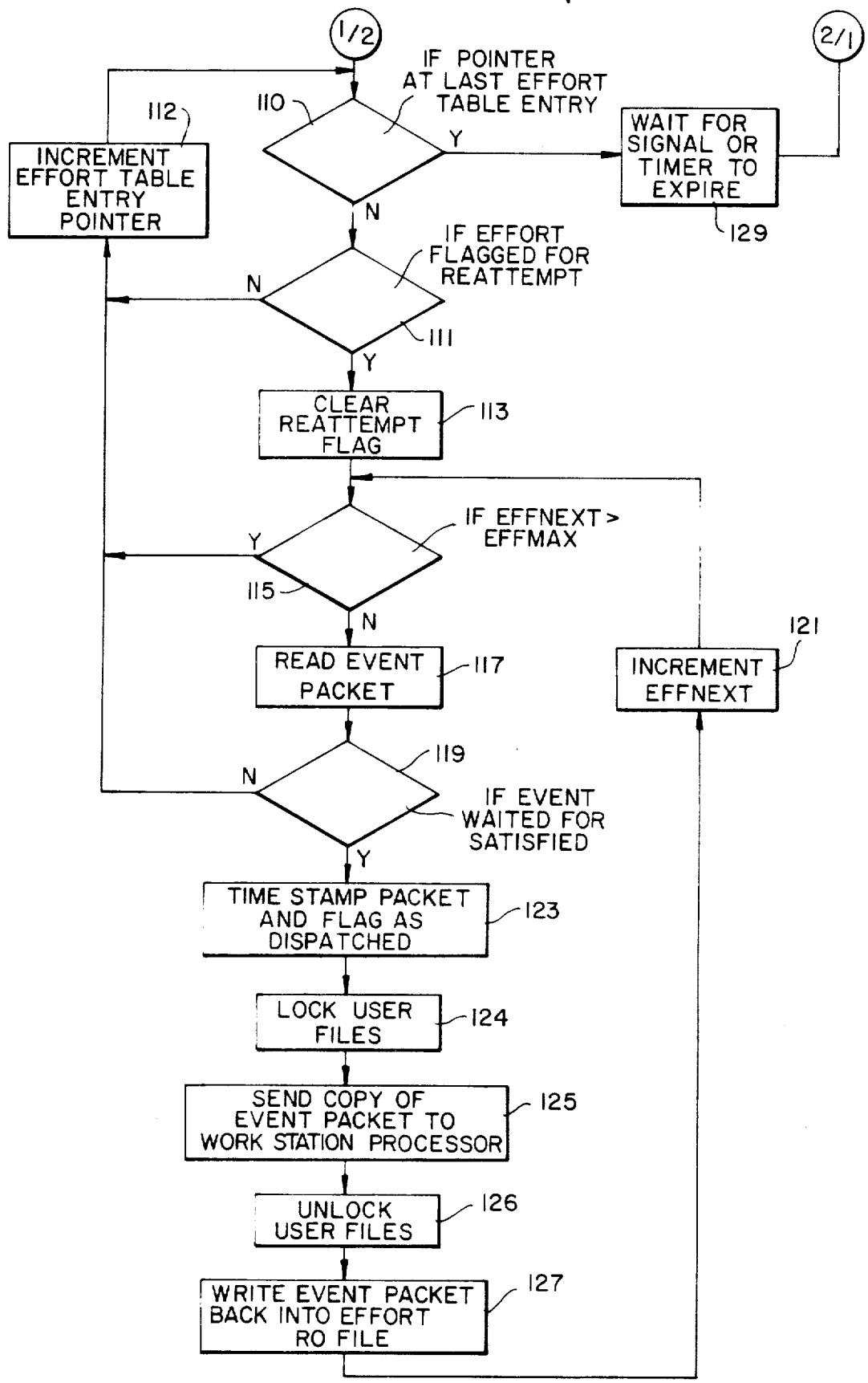

FIGS. 5a and 5b (hereinafter collectively referred to as FIG. 5) represent a flow chart for the dispatch process of the work daemon. As shown in FIG. 5a, the dispatch process, after being initiated by the main process, first enters into a process initialization instruction sequence 91, in which initialization steps are carried out. In this instruction sequence, pointers for the process are initialized, signal traps for the process are established, and pointers to the area of memory containing the above-mentioned tables, and to the process table itself, are established. The program then begins initializing the effort table by setting the effort table entry pointer to point to the first entry in the effort table in instruction sequence 92. The dispatch process then enters into decision sequence 93, in which it is determined whether or not the effort table entry pointer points to the last entry in the effort table, which is a dummy entry to signal the end of the table. If it does not, the program proceeds into decision sequence 95, in which it determines whether or not the entry in the effort table pointed to by the effort table entry pointer has its unused flag set. If the unused flag is set, this means that no active effort is listed in that entry slot of the effort table, and the program branches to instruction sequence 97 in which the effort table entry pointer is incremented to the next entry in the effort table. The program then proceeds back into the decision sequence 93 and the process repeats for the next entry in the effort table. If it is determined in decision sequence 95 that the unused flag is clear, then the program proceeds into instruction sequence 99 in which the number EFFMAX in the effort table entry is set to equal the event number of the last event in the effort RO file. After instruction sequence 99, the program proceeds into instruction sequence 103 in which the reattempt flag in the effort table entry is set. Following instruction sequence 103, the program proceeds into instruction sequence 97, in which the effort table entry pointer is incremented, and then into decision sequence 93 so that the process will be repeated for the next effort table entry. The process will continue to cycle in this routine until all of the entries in the effort table have been initialized whereupon the effort table entry pointer will be incremented to the dummy entry, which is the last effort table entry slot. At this time, the program in decision sequence 93 will determine that the effort table entry pointer is at the dummy entry and the program will branch into the decision sequence 107 to determine whether or not a flag called the shutdown flag is set. The shutdown flag may be set by the main process or other program sequences being executed by the CPU 20 in order to terminate the work daemon process. If the shutdown flag is set, the program branches into instruction sequence 108, in which the killed flag in the process table entry for the dispatch process is set and the dispatch process ends. Otherwise, the program proceeds into instruction sequence 109, in which the effort table entry pointer is again set to point to the first effort table entry, in order to scan the table for efforts which have event packets to the dispatched. The program then enters decision sequence 110, in which it is determined whether the effort table entry pointer is pointing at the dummy entry at the end of the table. If not, the program proceeds into decision sequence 111, in which it is determined whether or not the entry in the effort table entry has its reattempt flag set. If not, the program branches into instruction sequence 112, in which the effort table entry pointer is incremented to the next entry in the table. The program then proceeds back into decision sequence 110 and the process repeats for the next effort table entry. If the reattempt flag is set, then the program proceeds into instruction sequence 113, in which the reattempt flag is cleared. The prorgram then enters decision sequence 115, in which it is determined whether the value EFFNEXT is less than or equal to EFFMAX. As pointed out above, EFFNEXT is the event number of the next event packet to be dispatched and has been initially set to 1. EFFMAX is the event number of the last event packet in the effort RO file. If EFFNEXT is less than or equal to EFFMAX, the program proceeds into instruction sequence 117, in which the program reads out an event packet from the effort RO file pointed to by the effort RO file pointer in the effort table entry. The event packet read out will be the one having an event number equal to EFFNEXT and it will be read out to a register called the "event buffer". The program then proceeds into the decision sequence 119, in which it determines whether or not the preceding event packets identified in the events-waited-for section of the event packet in the event buffer have been completed. This is determined by whether or not the complete flags in the identified preceding event packets have been set. In addition, the program determines whether the complete flag in the start packet has been set in this decision sequence. When the program determines in decision sequence 119 that each of the preceding event packets identified in the events-waited-for section in the event packet stored in the event buffer has its complete flag set and the start packet also has its complete flag set, this means that the event packet in the event buffer is ready to be dispatched and the program will enter instruction sequence 123. In this instruction sequence, the current time is inserted into the time dispatched slot of the event packet and the dispatched flag will be set. After completing instruction sequence 123, the program proceeds into instruction sequence 124 in which the user file to which the event packet is to be sent is locked to prevent the work interface program from accessing this file while the work daemon is storing an event packet in the user's file.

The user file to which an event packet is to be sent in the dispatch process is called the "work new" file. Each user is assigned a work new file which is located in the memory of the work station processor associated with the user. The work new file is locked by the work daemon creating a file in the work station processor memory called the work lock file and assigned to the same user. The existence of this work lock file will prevent the work interface program from accessing the work new file assigned to the user simultaneously with the work daemon. In the instruction sequence 124, the work daemon first searches the remote processor memory for the existence of a work lock file assigned to the user of the event packet. If the work lock file is found, this means that the work new file has been locked by the work interface program and the work daemon cannot presently access the work new file to store the event packet in the work new file. Accordingly, the work daemon must wait in routine 124 until the file is unlocked by the work interface program removing the existing work lock file from the remote processor memory. When the work lock file no longer exists, the program in instruction sequence 124 will then create a work lock file assigned to the user of the event packet. The creation of the work lock file not only locks the work new file, but also locks another file assigned to the user called a "work purge" file, which will be explained below in connection with the collect request server subprocess. After creating the work lock file in routine 124, the program proceeds into instruction sequence 125, in which a copy of the event packet stored in the event buffer is sent to and stored in the work new file assigned to the user identified in the event packet. After storing the event packet in the work new file, the program unlocks the work new file and the work purge file in instruction sequence 126 by removing the work lock file from the work station processor memory. The program then proceeds into instruction sequence 127 in which the event packet is written back into the effort RO file as time stamped and flagged. The program then proceeds into the instruction sequence 121 to increment the EFFNEXT value in the effort table entry for the effort, and the process repeats for the next event packet in the effort RO file. When it is determined in decision sequence 119 that all of the complete flags are not set in the preceding event packets identified in the events-waited-for section of the event packet currently in the event buffer or if the complete flag is not set in the start packet, then program will branch out of the routine to instruction sequence 112 in which the effort table entry pointer is incremented and the sequence will be repeated for the next effort RO file listed in the effort table. Thus, the dispatch process dispatches each of the event packets in the effort RO file that are ready to be dispatched until it reaches one which is not ready to be dispatched as determined in decision sequence 119 whereupon the dispatch process goes to the next effort RO file. When all of the event packets are eventually dispatched from a given effort RO file, EFFNEXT will get incremented to a value greater than EFFMAX. When this happens, the dispatch process will determine this fact in decision sequence 115 and the dispatch process will branch out of the routine to instruction sequence 112. The process will be carried out in this manner for each effort table entry, thus dispatching the event packets of each active effort RO file until the effort table entry pointer is incremented to point to the last entry in the effort table, whereupon in sequence 110, the program will branch into instruction sequence 129. In instruction sequence 129, the program will wait until a timer expires or until a signal is received indicating that a complete flag has been set in an event packet whereupon the program proceeds back into instruction sequence 109 and the sequence will again repeat for all of the effort RO files listed in the effort table.

As pointed out above, the reattempt flag is cleared in instruction sequence 113 and, accordingly, the next time the program enters instruction sequence 111 for that same effort table entry, the program will branch into instruction sequence 112 and will not try to dispatch any event packets from the effort RO file unless the reattempt flag is reset between the time it is cleared in instruction sequence 113 and the next time the program enters decision sequence 111 with the effort table entry pointer again pointing to the same effort table entry. As will be explained below, the complete request server subprocess initiated by the request monitor in response to the request COMPLETE, will set the reattempt flag in the entry of the effort table and will send a signal to the dispatch process to wake it up in instruction sequence 129 and cause it to proceed into instruction sequence 109. Accordingly, each time an event packet is completed, the program will try to dispatch the event packets from the effort RO file the next time the effort table entry pointer recycles back to the entry for the effort in the effort table.

As described above, the dispatch process will stop dispatching event packets when it reaches an event packet which is not ready to be dispatched; that is, when it reaches an event packet which identifies in its events-waited-for section a preceding event packet which has not yet been completed. This means that no event packet will be dispatched unless all of the preceding event packets in the event RO file have already been dispatched. This constraint is adopted purposely as a conservative measure to ensure that one part of the project does not get ahead of another part of the project and requires that the effort manager set up the sequence of the work events in the effort with this constraint in mind. Alternatively, the dispatch process could be readily modified to dispatch all of the event packets in the effort RO file which do not await the completion of an uncompleted preceding event packet in the effort RO file as indicated in the events-waited-for sections of the event packets regardless of whether all of the preceding event packets have been dispatched.[5]

[5] The source code listing for the dispatch process if found in frames 364 to 379 in the microfiche appendix.

Figure 6:
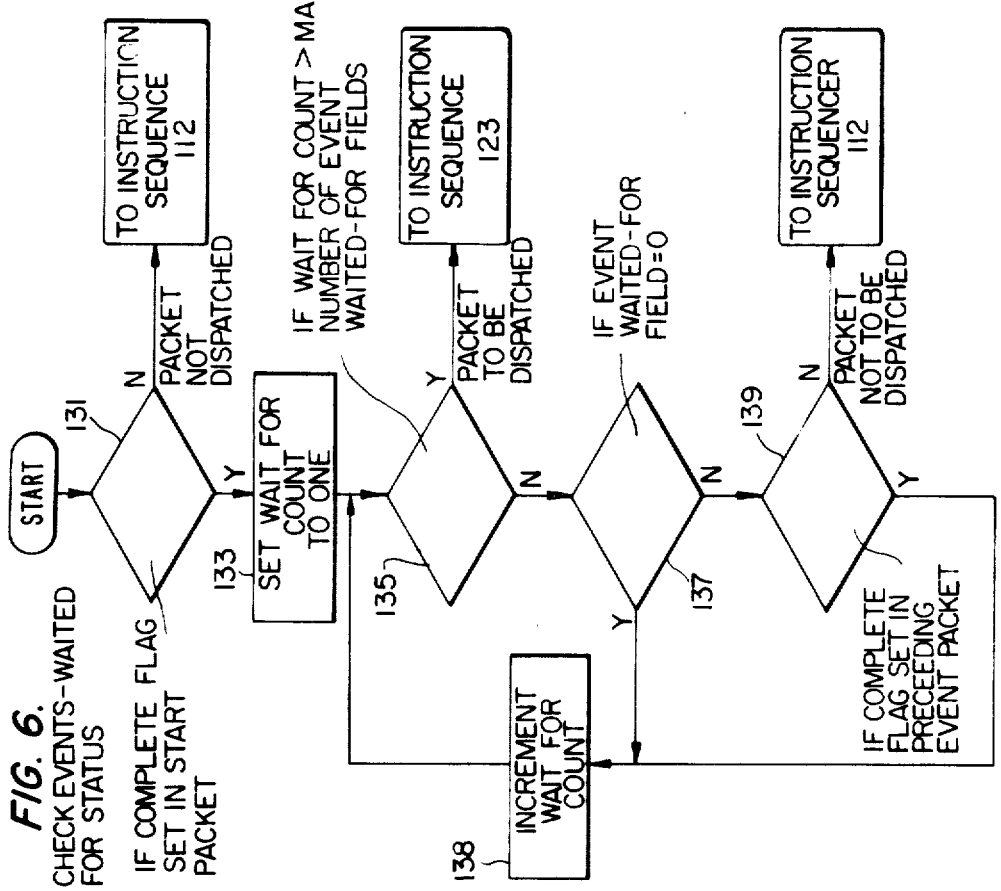
FIG. 6 is a flow chart illustrating the steps of a decision sequence employed in the dispatch process of FIGS. 5a and 5b in more detail.

FIG. 6 is a flow chart illustrating the steps in the decision sequence 119 of the flow chart of FIG. 5b in more detail. As pointed out above, it is determined in decision sequence 119 whether or not the preceding event packets identified in the events-waited-for section of the event packet currently in the event buffer have their complete flags set and whether or not the complete flag in the start packet has been set. In the decision sequence 119, as shown in FIG. 6, the program first enters decision sequence 131, in which it is determined whether or not the complete flag in the start packet has been set. If the complete flag in the start packet is clear, this means that the event packet is not to be dispatched and the program branches to instruction sequence 112 to increment the effort table pointer as described above with reference to FIG. 5b. If the complete flag in the start packet is set, then the program proceeds into instruction sequence 133, in which a count called the "wait for count" is set to one. The wait for count indexes into the array of event-waited-for fields in the event packet currently in the event buffer. The program then proceeds into decision sequence 135, in which it is determined whether or not the wait for count is greater than a predetermined number which is equal to the maximum possible number of event-waited-for fields in an event packet. If the wait for count is not greater than the number of event-waited-for fields, the program proceeds into decision sequence 137, in which the event-waited-for field indexed by the wait for count is examined to see if it is zero or not. As pointed out above, each of the event-waited-for fields may contain an event number of a preceding packet which must be completed before the present event packet can be undertaken. Those event-waited-for fields, which do not contain an event number of a preceeding event, contain zero meaning that they designate no preceding event packet which must be completed before the task of the current event packet is undertaken. Accordingly, if the event-waited-for field contains zero, the program branches from decision sequence 137 to instruction sequence 138, in which the wait for count is incremented and the program proceeds back into decision sequence 135 to repeat the sequence. If the event-waited-for field selected by the wait for count does not equal zero, then from decision sequence 137, the program proceeds into decision sequence 139, in which the complete flag in the preceeding event packet identified by the event number in the event-waited-for field indexed by the wait for count is examined to see if it is set or clear. If the complete flag is set, this means that the preceding event packet is complete and the program branches back into instruction sequence 138, in which the wait for count is incremented and the cycle repeats for the next event-waited-for field. If it is determined in decision sequence 139 that a preceeding event packet identified by an event number in the event-waited-for section has not been set, this means that the packet currently in the event buffer is not ready to be dispatched and the program will branch from decision sequence 139 into instruction sequence 112, as shown in FIG. 5b to increment the effort table pointer. If each time the program proceeds through decision sequences 137 and 139, it determines that the event-waited-for field is zero or the preceding packet identified in the event-waited-for section has its complete flag set, then eventually, the wait for count value will get incremented to a value greater than the maximum possible number of wait for fields in the event packet. If this happens, it means that the complete flags are set in all of the preceding event packets identified in the event-waited-for fields of the event packet in the event buffer. Accordingly, the determination in decision sequence 135 that the wait for count is greater than the number of event-waited-for fields means that all of the preceeding event packets identified in the event-waited-for fields of the event packet in the event buffer have their complete flags set and the task of the packet is ready to be undertaken. Accordingly, the program will branch to instruction sequence 123, as shown in FIG. 5b, to send the packet to the work station processor associated with the user who is assigned the task of the event packet.

REQUEST MONITOR PROCESS

Figure 7:
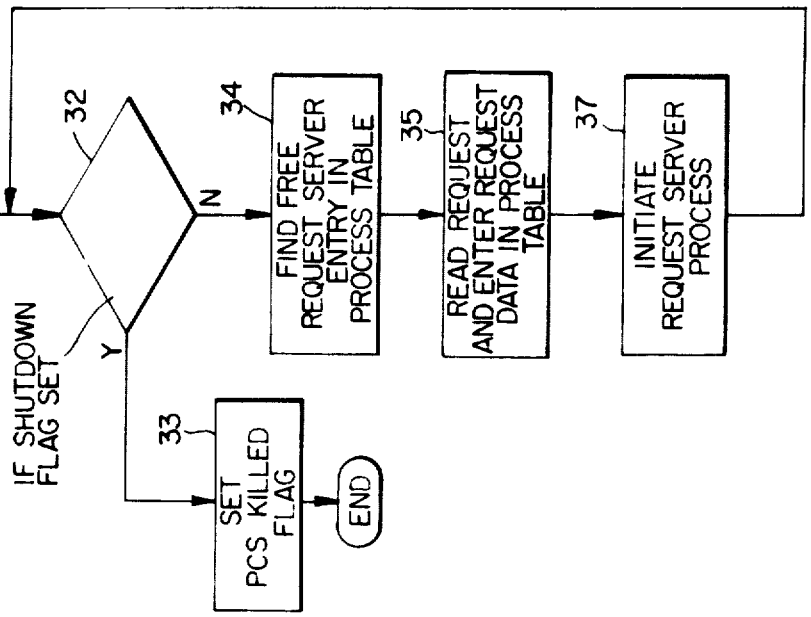
FIG. 7 is a flow chart illustrating a computer program process, called the request monitor, employed in the system of the present invention.

FIG. 7 represents a flow chart of the request monitor process of the work daemon. After being initiated by the main process, the request monitor process enters into the initialization instruction sequence 31, in which steps similar to that mentioned for the dispatch process initialization sequence are carried out, as described with reference to FIG. 5. The program then enters into a decision sequence 32, in which it is determined whether or not the shutdown flag has been set. If the shutdown flag has been set, the program branches into instruction sequence 33, in which the process killed flag in the process table is set and the program ends. If the shutdown flag is not set, the program enters into routine 34 in which the program finds an entry in the process table with its server and unused flags set indicating that the entry is for a server subprocess and that it is unused. The program then clears the unused flag and the program enters into instruction sequence 35, in which a request received from a work station processor is read and data corresponding to the specific request received from a work station processor is entered into the request server slot found in the process table. The program then enters into instruction sequence 37, in which the request server process corresponding to the received request is initiated to be carried out simultaneously with the other processes. The program then proceeds back into decision sequence 32 and the process repeats. In this manner, a request server process is initiated to carry out each request as it is received by the work daemon.[6]

[6] The source code listing for the request monitor process is found in frames 254 to 259 in the microfiche appendix.

The different requests from a work interface program that the request monitor will respond to are SELECT, COMPLETE, STOP, CANCEL, TRACE, START SESSION and END SESSION. As described above, the request SELECT is initiated by a user when he wants to begin work on the task of an event packet, which has been dispatched to his work new file. This request will carry with it an identification of the effort and the event packet selected. When the SELECT request is received, a server subprocess will be initiated to flag and timestamp the event packet as selected and issue a BORROW or COPY request to the central library facility to cause it to borrow or copy the document of the event packet if it exists in the central library facility and transmit the document to the remote processor from which the request SELECT was received.

As pointed out above, the request COMPLETE is initiated by the user to indicate to the work daemon that he has completed the task of a work packet. This request will carry with it an identification of the effort and the event packet which has been completed. In response to receiving this request, the request monitor will initiate a server subprocess which will flag the event packet as complete, enter the time in the time completed slot of the event packet and also set the reattempt flag in the entry for the effort in the effort table. In addition, the complete server subprocess will issue a request to the central library facility to cause any borrowed or newly created document to be fetched by the CLF daemon and stored in the library memory.

The request STOP is to stop the dispatching of the event packets from an active effort RO file and can only be initiated by the effort manager. This request will carry with it the identification of the effort which is to be stopped. In response to receiving the request STOP, the request monitor will initiate a server subprocess which will clear the complete flag in the start packet of the effort RO file identified by the STOP request. The dispatching of event packets can be restarted after a STOP request by a COMPLETE request identifying the start packet as the packet to be completed.

The request CANCEL is a request which can be initiated only by the effort manager and the purpose of this request is to cancel the effort, the identification of which will accompany the CANCEL request. In response to this request, the program initiates a server subprocess to clear the complete flag in the start packet so that no more event packets will be dispatched, collects all borrowed documents which are not the subject of an active work session, makes provision for the collection and return of those documents which are the subject of an active work session at the end of the work session and cancels the effort by setting the unused flag of the entry for the effort in the effort table if there are no active work sessions for the effort. If active work sessions exist, the cancelled flag for the effort is set as a reminder to set the unused flag when the active work sessions end.

The request TRACE is also a request which can be initiated only by the effort manager and the function of this request is to obtain a report on the status of the effort. This request will carry with it an identification of the effort which is to be reported on plus an indication of what kind of status report is desired. In response to this request, the request monitor will initiate a server subprocess to select one or more event packets and the selected event packets will be sent back to the remote processor from which the request TRACE was received. The event packets will include the time dispatched, time selected and time completed and, thus, the effort manager will obtain a report as to the progress of the selected event packets. If the request TRACE indicates that only the current status of the effort is sought, then the event packet which was last dispatched in the effort will be transmitted back to the remote processor. If the request TRACE indicates that the status is to be reported from the beginning of the effort, then all of the event packets which were dispatched between the time the effort was started and the current time will be transmitted back to the remote processor. If the request TRACE indicates a certain time window indicating a beginning time and an ending time, then all of of the event packets which were dispatched in the interval between the beginning and ending time interval will be selected and transmitted back to the remote processor.

The request START SESSION will be transmitted to the request monitor by a work interface program when a user enters the command WORK on his keyboard to indicate that he is starting a work session. The purpose of this request is to notify the request monitor that an active work session has been started and is going on so that the document of an event packet being worked on will not be collected during the active work session in response to the request monitor receiving a CANCEL or COLLECT request. This request will carry with it an identification of the user who started the work session. In response to receiving this request, the request monitor initiates a subprocess to store an entry identifying the user in a table called the session table.

The END SESSION request is transmitted by the work interface program in response to the user entering the command DONE on his keyboard indicating that he is ending an active work session. The purpose of this request is to cause collection of the documents at the end of the work session when a request CANCEL or a request COLLECT (explained below) occurred during the active work session. The END SESSION request will carry with it an identification of the user who ended the work session. In response to this request, the request monitor initiates a server subprocessor to collect any documents that were the subject of a COLLECT or CANCEL request during the active work session. In addition, if a CANCEL request was received and there are no other on-going active work sessions for which the CANCEL is pending, the subprocess will set the unused flag in the effort table entry for the effort to complete cancellation of the effort.

In addition to the above requests from the work interface program, the request monitor will also respond to a received request ADD EFFORT and the request COLLECT. The request ADD EFFORT is to add an effort to the list of active efforts on which work is to be done in the effort table. This request is not sent by the work interface program, but is sent automatically by the route compiler program after completing conversion of the route specification file into an effort RO file and will carry with it an identification of the effort. In response to this request, the request monitor will initiate a subprocess to set up an entry in the effort table for the effort and clear the used flag in the effort table entry.

Provision is made to initiate the request COLLECT by a debugging program. The function of this request is to collect all the documents of a given effort which have been borrowed from the central library facility. This request will carry with it an identification of the effort from which the documents are to be collected. In response to the request COLLECT, the request monitor will initiate a subprocess to cause all of the documents which are not presently the subject of an active work session by one of the users to be returned to the central library facility. The program also provides for the return of those documents which are the subject of an active work session when the active work session ends. The program sequence of the request server subprocess initiated in response to the request COLLECT is also caused to be executed by the server subprocess initiated in response to the CANCEL request.

Figure 8A:
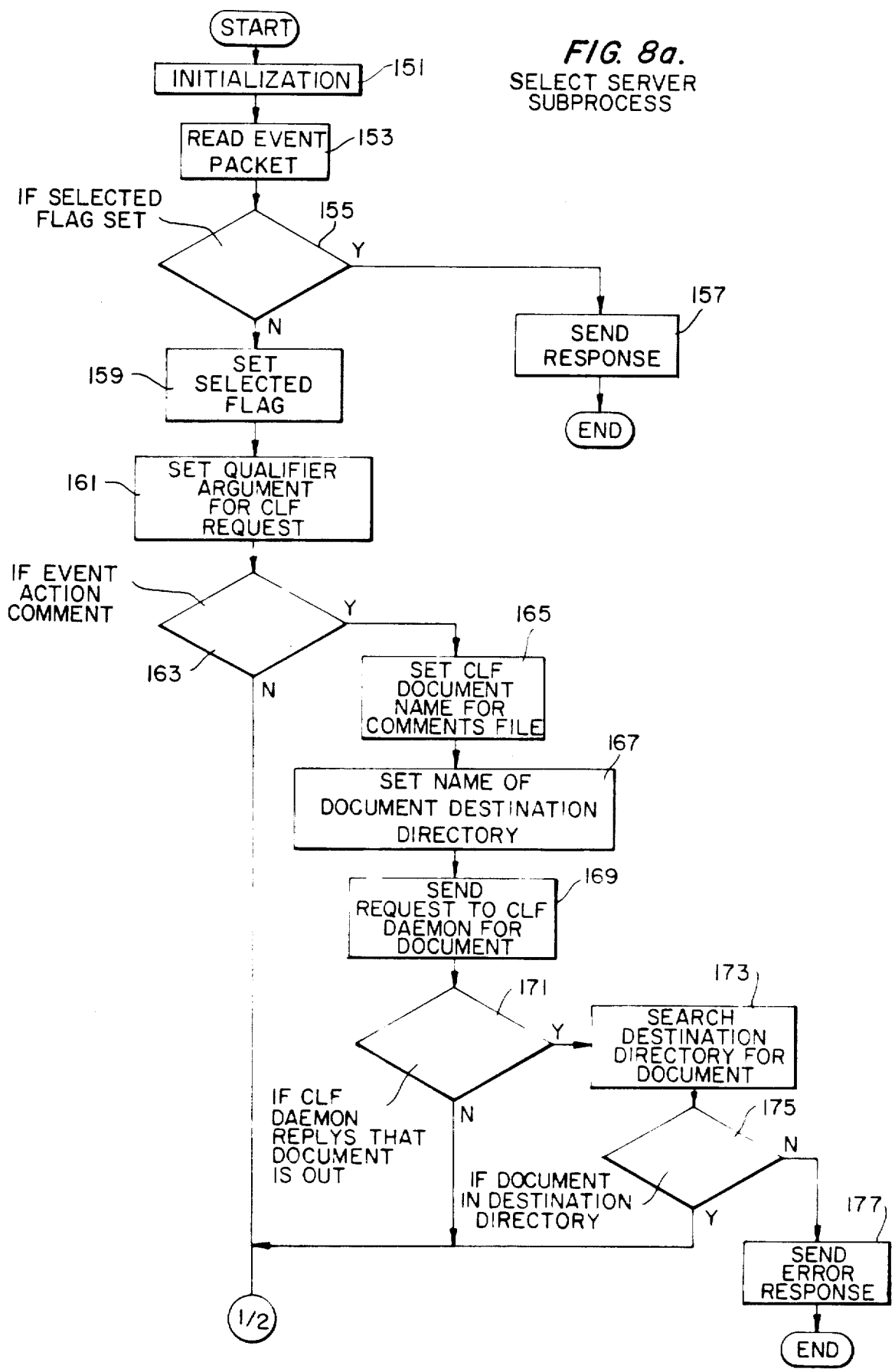
FIGS. 8a and 8b illustrate a flow chart of a computer program subprocess, called the select server subprocess, which is initiated by the request monitor process shown in FIG. 7.
Figure 8B:
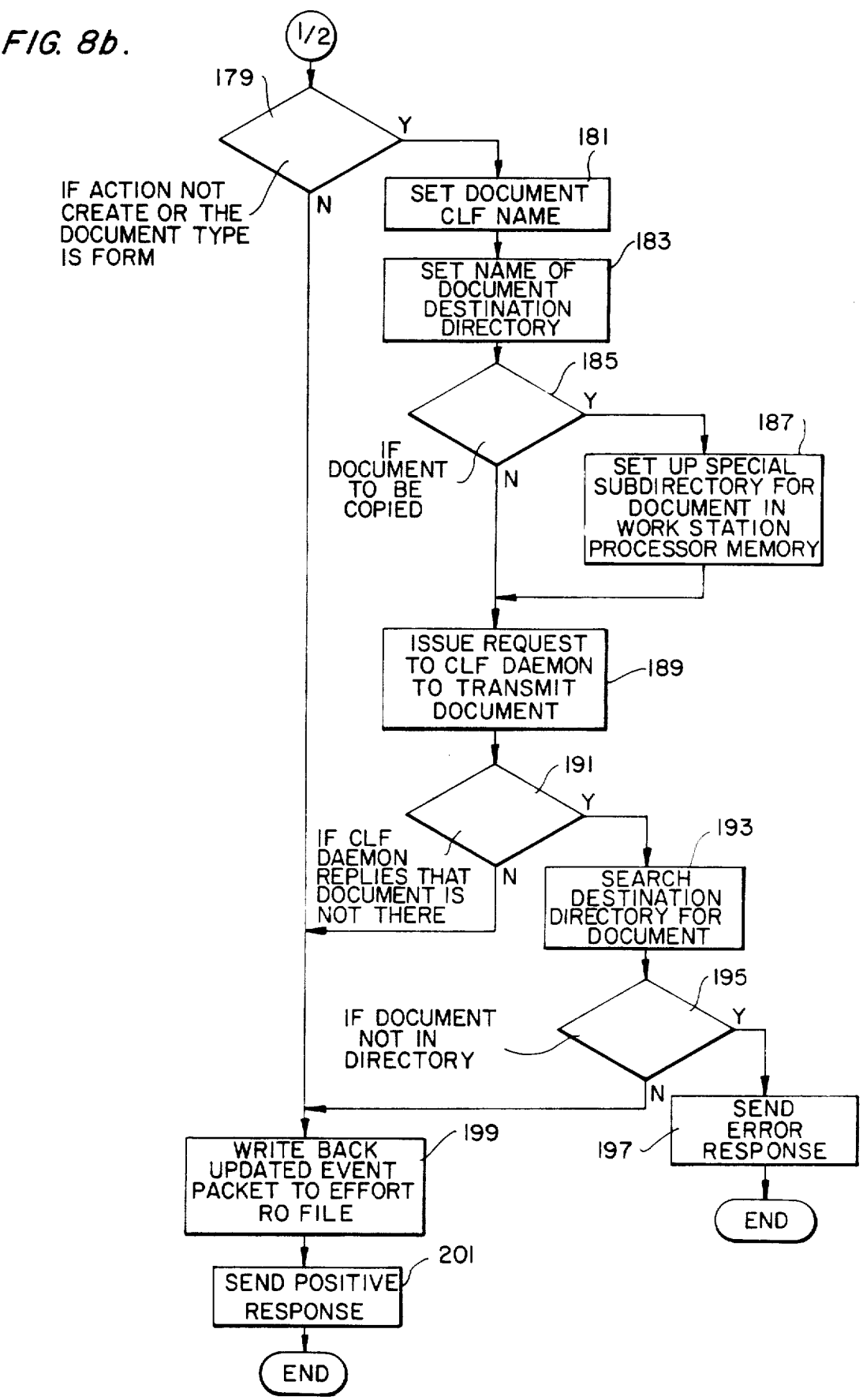

The select server subprocess, as shown in FIGS. 8a and 8b, after being initiated by the request monitor, enters into instruction sequence 151 in which initialization steps for the subprocess are performed similar to those employed in the dispatch process and the request monitor process. The program then proceeds into instruction sequence 153, in which the event packet identified in the SELECT request, which triggered the request server subprocess, is read out from the effort RO file into the event buffer. The program then proceeds into decison sequence 155, in which the selected flag of the event packet in the event buffer is examined to determine whether it is set or not. If it is set, this means that a select request has already been successfully processed for this event packet, but the successful completion of the response to the request may not have been communicated to the work interface program. Accordingly, upon determining that the selected flag has been set, the program branches into instruction sequence 157 to send a positive response that the SELECT response has been completed and the subprocess then terminates. If, in decision sequence 155, it is determined that the selected flag is not set, the program proceeds into instruction sequence 159, in which the selected flag in the event packet currently stored in the event buffer is set and the packet is timestamped in the events time field. The program then proceeds into instruction sequence 161 in which the request to be issued to the CLF daemon is set to be BORROW or COPY depending upon the task of the work event. If the task is update or sign, or if the task is create and the document is a form, the document is to be borrowed and the request to be issued is set to BORROW. If the task is to examine or comment, then the request to be issued is set to be COPY. If the document is not a form and the action is create, then no document will be borrowed or copied from the central library facility. After instruction sequence 161, the program proceeds into decision sequence 163, in which it is determined whether or not the event action is comment. If so, the program branches into instruction sequence 165, in which the central library facility document name for the comments file for the effort is set and the program then proceeds into instruction sequence 167. In this instruction sequence, the identification of the document directory to which the comments file document is to be sent and stored is set. The program then proceeds into instruction sequence 169, in which a BORROW request is issued to the CLF daemon to borrow the comments file document from the library and cause it to be sent to the document directory in the remote processor as identified by the directory name set in instruction seqeunce 167. If the central library facility replies that the comments file has already been borrowed, then, in decision sequence 171, the program branches to instruction sequence 173, in which the document directory, the name of which was set in instruction sequence 177, is searched to determine whether the comments file is already stored in the document directory. If the document is not found in the document directory, the program will then branch from decision sequence 175 into instruction sequence 177, in which the select server subprocess sends an error response back to the work interface program which sent the SELECT request and the select server subprocess ends. If the CLF dameon does not reply that the comments file is out or if it is determined in decision sequence 175 that the comments file is already in the document directory, then the program enters decision sequence 179 (FIG. 8b) to determine whether or not the the event action is create and whether or not the document type is a form. If the action is create and the program is not a form, then no document is to be borrowed or copied from the central library facility. If the action is not create, then a document must be borrowed or copied. Also, if the document is a form, then the document form must also be borrowed or copied from the central library facility.

Upon determining that the action is not CREATE, or that the document type is a form, the program branches from decision sequence 179 into instruction sequence 181, in which the name of the document as identified in the central library facilty is set. The effort name and document name in the effort uniquely identifies the document in the library memory. After sequence 181, the program enters instruction sequence 183, in which the name of the document directory for the destination of the document is set. Then in decision sequence 185, it is determined whether or not the document is to be copied or borrowed as indicated by the central library request set in instruction sequence 161. If the document is to be copied, the program branches into instruction sequence 187 in which a special subdirectory for the document is set up in the remote processor memory. This subdirectory will be named after the event user and is employed to prevent the fact that a copy of the document is stored in the remote processor memory from interfering with update operations on the same document when borrowed by another user at the same time. For example, when one first user has copied a document to examine it, a second user may be given the task of updating the same document and the second user may be proceeding with this updating while the first user is examining the document. Without the creation of the special subdirectory for the copy document, the updating by the second user on the document might be carried out on the copy of the document sent to the first user instead of on the borrowed document sent to the second user.

After instruction sequence 187, or after decision sequence 185, if the document is not to be copied, the program in instruction sequence 189 will issue the request that was set in instruction seqeunce 161 to the CLF daemon. The request will include the CLF document name set in instruction sequence 181 so that the CLF daemon can find the document, and the name of the document directory for the document destination set in instruction sequence 183 or 187. The CLF daemon will then respond to this request. If the request is a BORROW request and the document is in the central library facility, the CLF daemon will respond by flagging the document file in the central library facility as borrowed and transmitting the document to the document directory in the work station processor of the user. If the document has already been borrowed, the CLF daemon will return a response to the work daemon indicating that the document is out. If the document is to be copied, the CLF daemon will transmit a copy of the document whether or not it is already borrowed to the special document subdirectory set up for the copied document in the work station processor. If the CLF daemon replies to a BORROW request that the document is out, then the program in decision sequence 191 will branch into routine 193, in which the document directory to which the document is to be sent is searched for the document. Then from decision sequence 195, the program will branch into instruction sequence 197 if the document is not found in the document directory. In instruction sequence 197, the program will send an error response back to the work interface protram and the select server process will then end.

If in decision sequence 179 the program determines that the action is CREATE and that the document is not a form or if the CLF daemon does not reply that the document is out in response to the request sent in instruction sequence 189, or if in instruction sequence 193 the document is found, the program will enter instruction sequence 199. In instruction sequence 199, the updated event packet is written back into the effort RO file from the event buffer and the program then proceeds into instruction sequence 201, in which a positive response is sent back to the work interface program sending the request. The program then ends.[7]

[7] The source code listing for the select server subprocess is found in frames 274 to 285 in the microfiche appendix.

The reason that the program proceeds from decision sequence 195 into instruction sequence 199 if the document is found in the user director is because it may legitimately be assumed that the document was already successfully sent in response to a previous SELECT request by that user, but because of some failure in communication or otherwise, the selected flag had not been set and a positive response had not been sent back to the work interface program.

In the complete server subprocess, as shown in the flow chart of FIG. 9, the program first enters into an instruction sequence 211, in which initialization steps are performed similar to those described above with respect to the dispatch process as shown in FIG. 5. The program then proceeds into instruction sequence 213, in which the event packet of the RO file which is to be completed and which is identified in the COMPLETE request is read out and stored in the event buffer. The program then proceeds into decision sequence 215, in which it is determined whether or not the complete flag is set in the event packet in the event buffer. If the complete flag is already set in the event packet, this means that the request monitor has already performed the steps of the complete subprocess, but because of communication difficulty, a response to the COMPLETE request indicating successful completion of the subprocess was not sent to the work interface program. Accordingly, if in decision sequence 215, it determines that the complete flag is already set, the program jumps ahead to instruction sequence 217 to send a response to the work interface program that the complete request has been carried out and the subprocess then terminates. If, in decision sequence 215, it is determined that the complete flag is not set, then the program proceeds into instruction sequence 217, in which the complete flag is set and the time is entered in the event packet which is now in the event buffer. The program then proceeds into instruction sequence 219, in which any document which had been borrowed or newly created by the user for the event packet is caused to be fetched from the document directory at the work station processor and stored in the library memory. In this instruction sequence, the program sets the central library facility document name, sets the name of the document directory where the document is presently located and issues a request to the CLF daemon. If the document was borrowed, the complete server subprocess issues a RETURN request to the CLF daemon in instruction 221. If the document was newly created, the server subprocess issues a STORE request to the CLF daemon. The CLF daemon, in response to receiving the RETURN request, will fetch the document, store the document back in the library memory and clear the borrowed flag in the document file. In response to a STORE request, the CLF daemon will fetch the document, map a new document file in the CLF memory, and store the document in the new document file. In the instruction sequence 219, the server subprocess will also return the comments file with a RETURN request to the CLF daemon if it was borrowed when the event packet was selected.

After instruction sequence 219, the program proceeds into instruction sequence 221, in which the event packet in the event buffer as updated in the instruction 217 is stored back in the effort RO file. The program then proceeds into instruction sequence 223, in which the program sets the reattempt flag in the entry for the effort in the effort table so that the next time the dispatch process comes to this effort in the effort table, it will attempt to dispatch the event packets from this effort. The program then proceeds into instruction sequence 225 in which it sends a wake-up signal to the dispatch process so that if the dispatch process is sleeping in routine 129, it will wake up and again proceed through the effort table and attempt to dispatch the event packets of each effort which have their reattempt flags set. After instruction sequence 225, the program proceeds into instruction sequence 217, in which a response is sent to the work interface program from which the COMPLETE request was received indicating that it has successfully completed the complete server subprocess and the program then ends.[8]

[8] The source code listing for the complete server subprocess is found in frames 273 to 278 in the microfiche appendix.

As shown in FIG. 10, the start session server subprocess after being initiated by the request monitor process enters into an initialization instruction sequence 231, in which steps are performed similar to those carried out in the initialization instruction sequence for the dispatch process, as described above with reference to FIG. 5. After completion of instruction sequence 231, the program enters instruction sequence 233, in which the program searches a table, called the session table, for an empty slot or a slot assigned to the user who caused the START SESSION request to be sent by starting a work session at a work station. If a slot assigned to the user or an empty slot is not found, the program in decision sequence 235 branches to instruction sequence 237, in which the program sends a response to the work interface program from which the START SESSION request was received. The response sent indicates that there is no room in the session table and the program then ends. In normal circumstances, an empty slot will be found in the session table and, accordingly, the program will proceed from decision sequence 235 into instruction sequence 237, in which the used flag in the session table slot is set. The program then proceeds to instruction sequence 239, in which the identification of the user who started the work session causing the START SESSION request to be sent to the work daemon is entered in the session table slot. The program then proceeds into instruction sequence 241, in which a response is sent to the work interface program indicating successful completion of the start session server subprocess and the program ends.[9]

[9] The source code listing for the start session server subprocess is found in frames 217 to 220 in the microfiche appendix.

The collect server subprocess, as shown in FIG. 11, after being initiated, first enters the initialization instruction sequence 251, in which the program performs steps similar to the initialization steps performed in the dispatch process as described above with reference to FIG. 5. After completing the initialization steps, the program proceeds into instruction sequence 253, in which a count, referred to as the event count, is set to one. The program then proceeds into decision sequence 255, in which it is determined whether or not the event count is greater than the value EFFMAX. As explained above, EFFMAX is a number equal to the number of event packets in the effort. If the event count is less than or equal to EFFMAX, the program proceeds into instruction sequence 257, in which the event packet having the same event number as the event count is read into the event buffer. The program then proceeds into decision sequence 259, in which it is determined whether or not the event packet in the event buffer has been selected by examining the selected flag in the event packet. If the event packet has not been selected, the program branches to instruction sequence 261, in which the event count is incremented. The program then proceeds back into decision sequence 255 and the process repeats for the next event packet. If in decision sequence 259, it is determiend that the event packet has been dispatched, the program proceeds into decision sequence 263, in which it is determined whether or not the event packet in the event buffer is complete by examining the complete flag in the event packet. If the complete flag is set, the program branches to instruction sequence 261 and the process will repeat for the next event packet. If it is determined in decision sequence 261 that the event packet in the event buffer is not complete, then the program proceeds into routine 265 in which the work new and work purge files assigned to the user of the event packet are locked. This subroutine is the same as that described in routine 124 in the dispatch process. The program then proceeds into decision sequence 267, in which it is determined whether or not the user for the event packet in the event buffer is currently in an active work session. This is done by searching the session table to find an entry identifying this user in the session table. If an entry in the session table identifying the user is found and the used flag in this entry is set, this means that the user is currently engaged in an active work session. If it is determined that the user is in an active work session, the program branches into instruction sequence 269, in which the collection pending count in the effort table entry for this effort is incremented. The program then enters instruction sequence 271, in which the collection pending flag in the user's entry in the session table is set. The program then proceeds into instruction sequence 273, in which the effort identification and the event number is stored as a record in a file called a collection pending file. The collection pending file will be named for and correspond to the user identified in the event packet. The program then proceeds into instruction sequence 275, in which the user's work new and work purge files are unlocked in the same manner as in instruction sequence 126 in the dispatch process as described above with respect to FIG. 5. From instruction sequence 275, the program proceeds into instruction sequence 261 and the process is repeated for the next event packet of the event.

If in decision sequence 267, it is determined that the user is not in an active work session, the program proceeds into instruction sequence 277, in which the program sends a purge packet to the work purge file of the user identified in the event packet in the event buffer. The work purge file, like the work new file, is stored in the work station processor of the user. A purge packet will contain an identification of the effort and the event number in the effort. The work interface program will then later remove the corresponding event packet from the file of dispatched event packets for that user at the work station processor. The program then proceeds into instruction sequence 279 in which any document for this event packet which has been borrowed is returned to the central library facility in the same manner as described above in instruction sequence 219 in the complete server subprocess as described above with respect to FIG. 9. The program then proceeds into instruction sequence 275, in which the user's files are unlocked and the process repeats for the next event packet in the effort RO file.

After all of the event packets have been acted upon, the event count will become larger than the value of EFFMAX and in decision sequence 255, this fact will be determined. The program will accordingly then branch into decision sequence 281, in which it is determined whether or not the program being executed was initiated by the cancel server subprocess. The reason for this decision sequence is that the program of the collect server subprocess in addition to being able to be initiated by the request monitor can also be initiated by the cancel server subprocess. If the program was initiated by the cancel server subprocess, the program branches from decision sequence 281 to return to the cancel server subprocess to carry out additional steps of the cancel server subprocess. If the program was not initiated by the cancel server subprocess, the program proceeds into instruction sequence 283, in which a response is sent back to the work interface program which initiated the COLLECT request to indicate successful completion of the program and the program then terminates.[10]

[10] The source code listing for the collect server subprocess is found in frames 322 to 331 in the microfiche appendix.

The stop server subprocess, as shown in FIG. 12, after being initiated, enters initialization sequence 291, which is similar to the initialization step sequence employed in the dispatch process as described above with respect to FIG. 5. From instruction sequence 291, the program proceeds into instruction sequence 293, in which the program clears the complete flag in the start packet of the effort RO file identified in the request which initiated the subprocess. From instruction sequence 293, the program enters decision sequence 295, in which it is determined whether or not the program was initiated by the cancel server subprocess. The program of the stop server subprocess, like that of the collect server subprocess, is initiated by the cancel server subprocess in addition to being initiated by the request monitor. If the program was initiated by the cancel server subprocess, then from decision sequence 295, the program branches to return back to the cancel server subprocess so as to carry out additional steps in the cancel server subprocess. If the subprocess was not initiated by the cancel server subprocess, the program proceeds into instruction sequence 297, in which it sends a response back to the work interface program, which initiated the STOP request indicating successful completion of the server subprocess and the subprocess then ends.[11]

[11] The source code listing for the stop server subprocess is found in frames 234 to 237 in the microfiche appendix.

The cancel server subprocess, as shown in FIG. 13, after being initiated, enters initialization instruction routine 301, in which initialization steps are carried out similar to those in the initialization instruction sequence of the dispatch process as described above with reference to FIG. 5. From instruction sequence 301, the program proceeds into instruction sequence 303, in which the program of the stop server subprocess, as described above, with reference to FIG. 12, is carried out. When the stop subprocess is caused to be executed by the cancel server subprocess, the program of the cancel server subprocess does not proceed until the stop subprocess is completed in contrast to when the stop subprocess is initiated by the request monitor process. After execution of the stop subprocess, the program proceeds into instruction sequence 305, in which the program of the collect server process is executed in the manner as described above with reference to FIG. 11. As with the stop subprocess, the cancel server subprocess does not proceed until the collect server subprocess has been completed. After completion of the collect subprocess, the cancel server subprocess proceeds into decision sequence 307, in which the collection pending count in the effort table entry for the effort, which was the subject of the cancel request, is examined to see if it is zero. If the collection pending count is zero, this means that none of the event packets of the effort are the subject of an active work session. As explained above with respect to FIG. 11, the collection pending count is incremented in instruction sequence 269 in the collect subprocess. In the collect subprocess, the instruction sequence 269 is entered into each time it is determined that the event packet read out to the event buffer is the subject of an active work session. Accordingly, the collection pending count will get incremented for each event packet which is the subject of an active work session during the collect subprocess. As will be explained below, the collection pending count will get decremented by the end session server subprocess as each user ends an active work session. Accordingly, if the collection pending count is zero, this means that there are no outstanding active work sessions for any of the event packets of the effort. If it is determined in instruction sequence 307 that the collection pending count is zero, then the program proceeds into instruction sequence 309, in which the unused flag in the effort table entry for the effort is set. When the unused flag in the effort table entry has been set, as far as the work daemon is concerned, the entry in the effort table no longer exists and the effort is cancelled. If it is determined in decision sequence 307 that the collection pending count is not zero, then the program branches to instruction sequence 311 in which the cancelled flag in the effort table entry is set. This flag serves as a reminder to complete cancellation of the effort by setting the unused flag of the effort table entry when all of the active work sessions on event packets of the effort have been terminated. From instruction sequence 309 or 311, the program proceeds into instruction sequence 313, in which the program sends a response to the work interface program originating the CANCEL request indicating successful completion of the server subprocess and the subprocess then ends.[12]

[12] The source code listing for the cancel server subprocess is found in frames 267 to 272 in the microfiche appendix.

The end session server subprocess, as shown in FIG. 14, after being initiated by the request monitor process, enters initialization instruction sequence 321 in which initialization steps are performed similar to that described above for the dispatch process with respect to FIG. 5. From instruction sequence 321, the program proceeds into instruction sequence 323, in which the program locates the session table entry for the user who caused the work interface program to send the END SESSION request in response to the user terminating the active work session. After locating this entry, the program proceeds to decision sequence 325, in which it is determined whether or not the collection pending flag in this session table entry is set. If the collection pending flag is not set, this means that no document collection was attempted during the active work session for any of the selected and uncompleted event packets assigned to that user. Under these circumstances, the program branches to instruction sequence 327 and clears the used flag from the session table entry and then proceeds into instruction sequence 329, in which a response is sent to the work interface program that transmitted the END SESSION request indicating that the end session server request has been successfully completed. The server subprocess then ends.

If in decision sequence 325 it is determined that the collection pending flag is set in the session table entry for the user who is ending the active work session, the program then proceeds into instruction sequence 331, in which the first record stored in the collection pending file for that user is read out. This record will contain the effort identification and the event number of an event packet, which was selected by the user, but not yet completed when an attempt was made to collect the document of the event packet. After instruction sequence 331, the program enters instruction sequence 333, in which the event packet identified in the record in the collection pending file is read out from the effort RO file to the event buffer and the program proceeds into decision sequence 335. In decision sequence 335, it is determined whether or not the event packet in the event buffer is not yet completed. If the event packet has already been completed, the program jumps ahead to instruction sequence 336, in which the collection pending count for the effort table is decremented. However, if the event is not complete, then the program proceeds from decision sequence 335 into instruction sequence 337, in which the user's work new and work purge files at the remote processor are locked in the same manner as in routine 124 in the dispatch process described above with respect to FIG. 5. The program then proceeds into instruction sequence 339, in which a purge packet is sent to the work purge file of the user to store an identification of the packet in the event buffer in the user's work purge file. The program then proceeds into instruction sequence 341 to return any borrowed document of the event packet in the event buffer to the central library facility in the same manner as the complete server subprocess. The program then proceeds into instruction sequence 343 in which the user's work new and work purge files are unlocked. The program then proceeds into instruction sequence 336 in which the collection pending count in the effort table entry is decremented.

After instruction sequence 336, the program proceeds into decision sequence 345, in which it is determined whether or not the collection pending count is zero and if the cancelled flag is set. If the collection pending count is zero and the cancelled flag is set, the program branches into instruction sequence 347, in which the cancelled flag is cleared and the unused flag for the effort table entry is set thus effectively cancelling the effort. The program then enters decision sequence 349, in which it is determined whether the record read from the collection pending file was the last record in the collection pending file. If it is not the last record, the program returns to instruction sequence 331 to repeat the routine for the next record in the collection pending file. When the last record in the collection pending file has been processed, the program enters instruction sequence 349, in which the collection pending flag and the used flag are cleared in the session table entry identifying the user who caused the END SESSION request to be initiated by ending an active work session. The program then proceeds into instruction sequence 351, in which a response is returned to the work interface program which transmitted the END SESSION request indicating successful completion of the end session server subprocess and the program then terminates.[13]

[13] The source code listing for the end session server process is found in frames 303 to 310 in the microfiche appendix.

Figure 15:
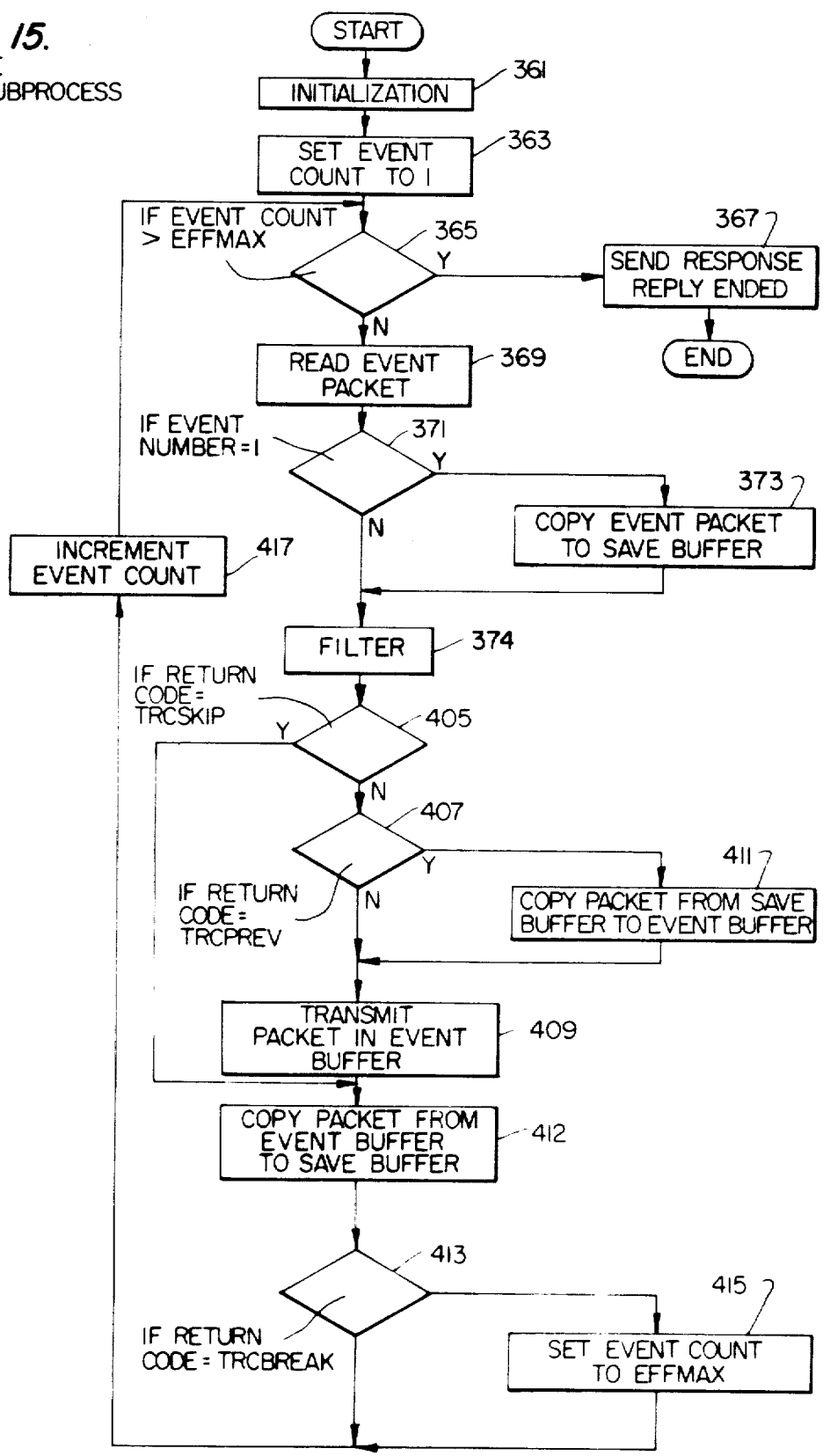
FIG. 15 is a flow chart illustrating a computer program subprocess, called the trace server subprocess, which is initiated by the request monitor process shown in FIG. 7.

In the trace server subprocess, as shown in FIG. 15, the program first enters into initialization instruction sequence 361 in which initialization steps are performed similar to that performed in the dispatch process as described above with reference to FIG. 5. The program then proceeds into instruction sequence 363, in which a count called the "event count" is set to one. The program then proceeds into decision sequence 365 in which it is determined whether or not the event count is greater than EFFMAX. If the event count is not greater than EFFMAX, then the program proceeds from decision sequence 365 into instruction sequence 369, in which the event packet having an event number corresponding to the event count is read out from the effort RO file to the event buffer. The program then proceeds into decision sequence 371, in which it is determined whether or not the event number in the event packet is equal to one. If it is determined that the event number of the event packet in the event buffer is not equal to one, the program proceeds into filter subroutine 374. If the event number is equal to one, the program branches into instruction sequence 373 in which a copy of the event packet in the event buffer is stored in another buffer register called the "save buffer". From instruction sequence 373, the program then enters filter subroutine 374.

The TRACE request will carry with it two values called TRACE TIME 1 and a TRACE TIME 2 which are set in accordance with what kind of status report the user who initiated the TRACE request desires. If the user desires a report on only the current status of the effort, then TRACE TIME 1 will be set to zero and TRACE TIME 2 will be set to the current time. With TRACE TIMES 1 and 2 set in this manner, the trace server subprocess will send back to the work interface program which sent the TRACE request the last event packet dispatched from the effort RO file. If the user desires a report on the status of all the event packets within a time window, then TRACE TIME 1 will be set to equal the time at the beginning of the window and TRACE TIME 2 will be set to equal the time at the end of the window. With TRACE TIMES 1 and 2 set in this manner, the trace server subprocess will transmit to the work interface program all of the event packets which were dispatched between TRACE TIME 1 and TRACE TIME 2. If the user desires a report on all of the event packets from the beginning of the effort, up to the current time, then TRACE TIME 1 will be set to one and TRACE TIME 2 will be set to the current time. With TRACE TIMES 1 and 2 set in this manner, the trace server subprocess will send the work interface program all of the event packets that have so far been dispatched from the effort RO file.

The TRACE request, in addition to being initiated by a TRACE command entered into the remote station by a user will also be initiated by the work interface program in response to any administrative type command for the purposes of obtaining the name of the effort manager from a given effort. A TRACE request initiated in response to an administrative type command for this purpose will have both its TRACE TIMES 1 and 2 set to zero. With TRACE TIMES 1 and 2 set in this manner, the request server subprocess will send the work interface program the first event packet in the effort RO file. From this first event packet, the work interface program can then obtain the name of the effort manager.

The filter subroutine 374 can return a filter return code TRCPREV, a return code TRCSKIP or neither of these two codes. If the return code TRCPREV is returned, this means that the event packet in the effort RO file immediately preceding the event packet in the event buffer is to be sent to the work interface program. If the return code is TRCSKIP, this means that the program should not send at that point in the program any event packet back to the work interface program. If neither the code TRCPREV or TRCSKIP is returned by the filter subroutine, this means that the event packet in the event buffer is to be sent to the work interface program. In combination with these codes, the filter subroutine can also return a code TRCBREAK which is to signal the fact that no further event packets, beyond the ones already read out from the RO file, are to be sent back in response to the TRACE request and the server subprocess should be ended.

Figure 16:
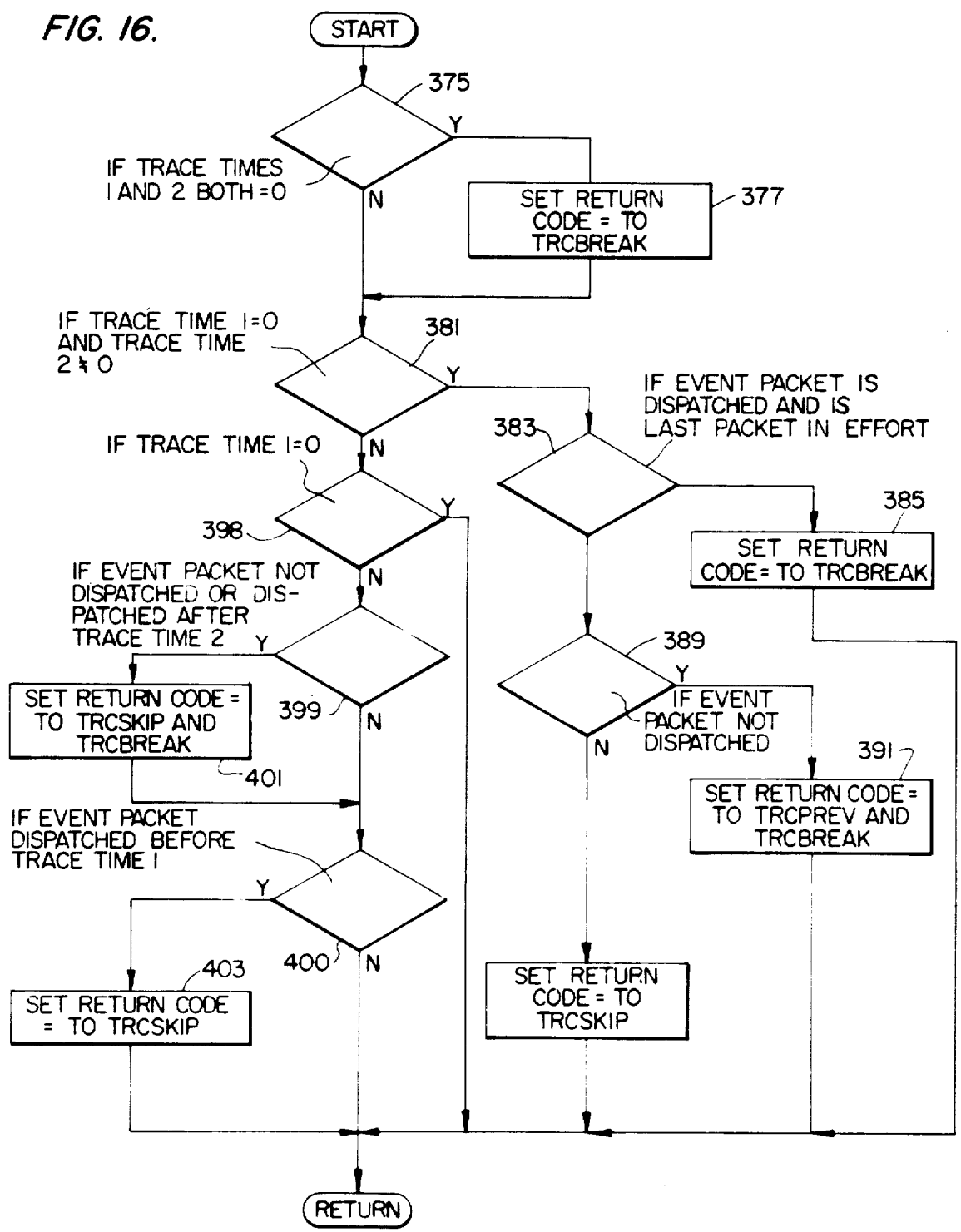
FIG. 16 is a flow chart illustrating a computer program subroutine illustrating part of the subprocess of FIG. 15 in more detail.

The steps of filter subroutine 374 are shown in more detail in FIG. 16. As shown in FIG. 16, the program first enters decision sequence 375, in which the program determines whether or not both TRACE TIME 1 and TRACE TIME 2 are set to zero. If they are not both zero, the program proceeds into decision sequence 381. If both TRACE TIMES 1 and 2 are zero, the program branches from decision sequence 375 into instruction sequence 377, in which a filter return code TRCBREAK is set and the program then proceeds into decision sequence 381. In decision sequence 381, it is determined whether TRACE TIME 1 is zero and TRACE TIME 2 is not zero. If TRACE TIME 1 is zero and TRACE TIME 2 is not zero, the program branches into decision sequence 383, in which it is determined whether the event packet in the event buffer is the last event packet of the effort and if it has been dispatched. If it is not the last packet or has not been dispatched, the program proceeds into decision sequence 389. If the event packet in the event buffer is the last event packet of the effort and it has been dispatched, the program branches into instruction sequence 385, in which a return code of TRCBREAK is set and the program then exits from the filter subprocess. Decision sequence 389 determines whether the event packet in the event buffer has been dispatched. If it has not been dispatched, the program branches from decision sequence 389 into instruction sequence 391, in which filter return codes TRCPREV and TRCBREAK are set. If the event packet in the event buffer has been dispatched, the program proceeds from decision sequence 389 into instruction sequence 393, in which a return code of TRCSKIP is set. From instruction sequences 391 and 393, the program exits from the filter subroutine.

When the TRACE TIME 1 does not equal zero or TRACE TIME 2 does equal zero, the program proceeds from decision sequence 381 into decision sequence 398, in which it is determined whether TRACE TIME 1=0. If TRACE TIME 1 equals 0, the program exits from the filter subroutine from decision sequence 398. If TRACE TIME 1 does not equal 0, the program enters decision sequence 399, in which it is determined if the event packet in the event buffer has not been dispatched or was dispatched after TRACE TIME 2. If the event packet has been dispatched and was not dispatched after TRACE TIME 2, the program proceeds into decision sequence 400. If the event packet has not been dispatched or was dispatched after TRACE TIME 2, the program branches into instruction sequence 401, in which return codes of TRCSKIP and TRCBREAK are set, and then the program proceeds into decision sequence 400. In decision sequence 400, it is determined whether the packet in the event buffer was dispatched before TRACE TIME 1. If the packet in the event buffer was not dispatched before TRACE TIME 1, the program exits from the filter subroutine. If it was dispatched before TRACE TIME 1, the program branches into instruction sequence 403, in which a return code of TRCSKIP is set and the program then exits from the filter subroutine.

After completing the filter subroutine, the program proceeds into decision sequence 405, as shown in FIG. 15, in which it is determined whether or not a filter code response TRCSKIP was set in the filter subroutine. If a TRCSKIP return code was not set, the program proceeds into decision sequence 407, in which it is determined whether or not the filter return code TRCPREV was set. If the filter return code TRCPREV was not set, the program proceeds into instruction sequence 409. If the filter return code TRCPREV was set, the program branches into instruction sequence 411, in which the event packet in the save buffer is copied back into the event buffer and then the program proceeds into instruction sequence 409. In instruction sequence 409, the event packet stored in the event buffer is transmitted to the work interface program at the remote station from which the TRACE request was received. After completing instruction sequence 409, the program proceeds into instruction sequence 412 in which the packet in the event buffer is copied into the save buffer and then the program proceeds into decision sequence 413. If in decision sequence 405, it is determined that the filter return code TRCSKIP was set, the program jumps forward from decision sequence 405 into decision sequence 412. In decision sequence 413, the program determines whether the filter return code TRCBREAK was set. If the filter return code TRCBREAK was set, the program branches into instruction sequence 415, in which the event count is set equal to EFFMAX. From instruction sequence 415, or from the decision sequence 413 when the filter return code TRCBREAK has not been set, the program proceeds into instruction sequence 417, in which the event count is incremented. The process then proceeds back into decision sequence 365 and the process repeats for the next event packet. The process will continue to process the event packets in the effort RO file in this manner until it is determined in decision sequence 365 that the event count is greater than EFFMAX, in which case the program branches to instruction sequence 367. In instruction sequence 367, the program transmits a response to the work interface program from which the TRACE request was received indicating that the response to the TRACE request has ended. Following instruction sequence 367, the server subprocess ends.[13]

[13] The source code listing for the trace server subprocess is found in frames 142 to 148 in the microfiche appendix.

As a result of the above described operation, if both TRACE TIMES 1 and 2 are zero, then when the first event packet is read into the event buffer and the program gets into instruction sequence 377 in the filter routine, as shown in FIG. 16, the return code TRCBREAK will be set. If TRACE TIMES 1 and 2 are zero, neither TRCSKIP nor TRCPREV will be set. Then when the process gets to instruction sequence 409, the first event packet will be sent to the work interface program. Because of the setting of the code TRCBREAK, the program will branch into instruction sequence 415 and the event count will get set to equal EFFMAX. Accordingly, the event count after being incremented in instruction sequence 397 will be greater than EFFMAX and the program will then branch into instruction sequence 367 so that the trace server subprocess will end after sending out the first event packet.

If the TRACE TIME 1 is zero and the TRACE TIME 2 is not zero, as explained above, this means that the program is looking for a single event packet that was the last dispatched event packet in the effort RO file. With the trace codes set in this manner, each event packet (except the last) that is read out to the event buffer and is found have already been dispatched, will cause the trace code of TRCSKIP to be set in instruction sequence 393 so that instruction sequence 409 will be skipped and no event packet will be sent to the work interface program at this point in the server subprocess. However, when the first event packet which is not dispatched is read out to the event buffer and processed through the filter, the program will branch into instruction sequence 391 so that the trace code TRCPREV is set. Accordingly, the program will copy the previous event packet from the save buffer back into the event buffer in instruction sequence 411 and in instruction sequence 409 the previous event packet in the effort RO file will be transmitted to the work interface program. In this manner, the last event packet which was dispatched is sent to the work interface program when TRACE TIME 1 is zero and TRACE TIME 2 is set to the current time. Also, since in instruction sequence 391 the filter return code TRCBREAK is set, the value of the event count will be greater than EFFMAX the next time the program gets into decision sequence 365 and the trace server subprocess will end. If, with the TRACE TIME 1 set to zero and the TRACE TIME 2 set to the current time, the program processes all the way through all of the event packets in the effort RO file and gets to the last event packet and finds this packet has been dispatched, this means that the last event packet of the effort RO file is the event packet that was the last dispatched event packet of the effort. Accordingly, in instruction sequence 385, the return code TRCBREAK is set and the program exits from the filter subroutine without setting TRCSKIP or TRCPREV. As a result, the last event packet in the effort RO file will be sent to the work interface program in instruction sequence 409.

If the TRACE request is asking for the status of the event packets within a given time window, then TRACE TIMES 1 and 2 will define this time window and the program will enter sequence 399 in the filter subprocess. Similarly, if the TRACE request is asking for the status of all the event packets up to the current time, then TRACE TIME 1 will be set to 1 and TRACE TIME 2 will be set to the current time and the program will enter the decision sequence 399. With both the TRACE TIMES set to nonzero in this manner, each time an event packet is found in the filter subroutine to have been dispatched before TRACE TIME 1, the program in instruction sequence 403 will set a return code TRCSKIP so that no event packet will be transmitted to the work interface program for this event packet in the event buffer. With the TRACE TIMES 1 and 2 both nonzero, each time an event packet is found in the filter routine to have been dispatched after TRACE TIME 1 and prior to TRACE TIME 2, no return codes will be set in the filter routine and, accordingly, the current event packet in the event buffer will be transmitted to the work interface program in instruction sequence 409. When the filter routine reaches a packet which has not yet been dispatched, or an event packet which was dispatched after TRACE TIME 2, then the program in instruction sequence 401 will set the return codes TRCSKIP and TRCBREAK so that the server subprocess will then end and no more event packets will be sent to the work interface program. In this manner, all of the event packets which were dispatched between TRACE TIMES 1 and 2 define a time window and all of the event packets which have been dispatched up to the current time are sent to the work interface program when TRACE TIME 1 is set to 1 and TRACE TIME 2 is set to the current time.

The add effort server subprocess, as shown in FIG. 17, after being initiated by the request monitor, enters initialization instruction sequence 441, in which initialization steps are performed similar to those employed in the dispatch process, as described above with respect to FIG. 5. After the initialization sequence, the program proceeds into decision sequence 443, in which it is determined whether or not the effort which is to be added by the ADD EFFORT request already exists. This is done by comparing the effort identification accompanying the ADD EFFORT request with the effort identifications found in effort table slots with the unused flags clear. If the same effort is found already to exist, the program branches into instruction sequence 445 in which the response is sent back to the route program, which initiated the ADD EFFORT request, indicating that the effort exists. If the same effort is not found in the effort table, the program proceeds into instruction sequence 447, in which the effort table is searched for an empty slot, that is, any slot in the effort table with the unused flag for the slot set. If the search for an empty slot in the effort table is not successful, then in decision sequence 449, the program branches to instruction sequence 451, in which it sends a response back to the route compiler program that there is no room for the effort in the effort table. If an empty slot in the effort table is found, the program proceeds into instruction sequence 453, in which the data for the effort is entered into the effort table slot. In this step, the effort identification including the effort type is entered in the effort table. The program then enters instruction sequence 455, in which the value of EFFMAX is set to the event number of the last event in the effort RO file. Following instruction sequence 455, the program enters instruction sequence 457, in which the unused flag in the effort table entry slot is cleared. The program then sends a positive response back to the route compiler program in instruction sequence 459 and the server subprocess then ends.[14]

[14] The source code listing for the add effort server subprocess is found in frames 249 to 253 in the microfiche appendix.

Because all of the request server processes can operate simultaneously with each other and with the request monitor process and the dispatch process, and each of the simultaneously operating processes may have occasion to access the process table, the effort table, and the session table, it is necessary for the entries of each of these tables and files to be locked before the entries are accessed by a process to prevent errors caused by more than one process simultaneously accessing the same table entry and then unlocked after accessing the entries. When an effort table entry is locked by a given process, no other process may access the entry in the table. The locking of an entry is carried out by setting a locked flag in the table entry. The locking process first determines whether or not the entry is already locked and, if so, it then waits until the entry becomes unlocked before proceeding. The table entry is unlocked by clearing the locked flag for the table entry. For purposes of simplifying the illustration and description of the invention, these steps of locking and unlocking the table entries have not been included in the flow charts illustrating the various work daemon processes.

WORK INTERFACE PROGRAM

When a user begins operations at a work station, the first thing that he does is enter by means of the keyboard at the work station his identification, which is referred to as his LOGIN. In response to the entry of a LOGIN at a work station, the program at the work station processor examines the work new file assigned to the user identified by the LOGIN. If there are event packets in the user's work new file, this fact will mean that additional event packets have been dispatched to the work new file of the user since the last time this user initiated an active work session. The work station processor program, in response to finding event packets in the new work file, signals the existence of these newly received event packets by energizing the work light 18, as shown in FIG. 1a, on the work station terminal from which the LOGIN was received and also displaying on the CRT display "work alarm" and causing the generation of six rapid beeps. In this manner, the user is notified that he has received new event packets to be worked upon since the last time he started a work session.

In order to start a work session after entering his LOGIN, a user enters the command WORK on the keyboard of the work station. In response to this command, the work station processor program starts the work interface program of the work station processor. The work interface program will respond to the following commands entered on the keyboard of the work station: LIST, SELECT, COMPLETE, SHOW, ADMIN START, ADMIN STOP, ADMIN TRACE, ADMIN CANCEL, and DONE. In response to the command LIST, the program displays a summary of each of the work packets in the "work current" file assigned to the user who entered the command as identified by his LOGIN. The work current file is intended to include all of the event packets which have been dispatched to the user and which have not yet been completed. The event packets in the work new file are removed from the work new file and stored in the work current file automatically whenever the user initiates the work interface program by the command WORK. The commands SELECT, COMPLETE and SHOW should be accompanied by a keyboard entered identification of an event packet in the work current file of the user. In response to the command SELECT, the program sends a request SELECT to the work daemon to be responded to by the request monitor process. It also flags the event packet in the work current file as selected and enters the time the event packet was selected. In addition, it displays the document of the event packet on the CRT display of the work terminal and invokes the tool corresponding to the document type to carry out the action of the event. In response to the command COMPLETE, the program removes the packet from the work current file and sends a COMPLETE request to the work daemon to be responded to by the request monitor process. In response to the command SHOW, the program displays a complete report of the information in the event packet identified by the keyboard input accompanying the command SHOW.

In response to the administrative type commands ADMIN START, ADMIN STOP, ADMIN TRACE, ADMIN CANCEL, and ADMIN COLLECT, the program first does a check on the authority of the user to enter an administrative type command. Only the effort managers have authority to enter an administrative type command. If the user has authority, the program then carries out the administrative type command. Administrative type commands should be accompanied by a keyboard entered identification of an effort. In response to the request ADMIN START, the work interface program sends a COMPLETE request to the work daemon at the central processor identifying the start packet of the keyboard identified effort as the packet to be flagged as completed. In response to the command ADMIN STOP, the work interface program sends a STOP request to the work daemon. In response to the command ADMIN TRACE, the program first determines what kind of status report the user wants and then sends an appropriate TRACE request to the work daemon. In response to the request ADMIN CANCEL, the program sends a CANCEL request to the work daemon. In response to the command DONE, the program sends an END SESSION request to the work daemon and terminates the work interface program.

As shown in FIG. 18, the work interface program after being initiated by the command WORK enters instruction sequence 471 in which it turns off the work light 18 on the work station terminal and then enters instruction sequence 473. In instruction sequence 473, the program locks out the work daemon from the work new file and work purge file. This is done by the work interface program in the same manner that the work daemon locks out the work interface program from these two files; that is, that the program first searches for the existence of a work lock file assigned to the user identified by the LOGIN. If such a file exists, this means that the work daemon has locked out the work interface program and, accordingly, the work interface program must wait and then try again to lock out the work daemon after the work daemon releases the work lock by removing the work lock file. When the work interface program in instruction sequence 473 finds no work lock file, it creates a work lock file to lock out the work daemon and then proceeds into instruction sequence 475, in which the work interface program sends the work daemon a START SESSION request identifying the user in accordance with the user's LOGIN. From instruction sequence 475, the program proceeds into instruction sequence 477, in which the program reads the work purge file and makes entries in a purge table assigned to the user identifying each purge packet stored in the work purge file. The program then enters instruction sequence 479, in which the packets in the user's work new file are removed from the work new file and added to the user's work current file.

The program next in instruction sequence 483 locks out the response of the work interface program to the commands SELECT and COMPLETE. In this instruction sequence, the work interface program sets a flag called the "list switch" and while the list switch is set, the work interface program will not respond positively to the commands SELECT or COMPLETE. This is so the user has to enter the command LIST before he enters the commands SELECT or COMPLETE in order to be informed of the identification of the work packets in the work current file. After locking out the commands SELECT and COMPLETE in instruction sequence 483, the program enters instruction sequence 485, in which the program reads the command entered by the user on the keyboard. The program then proceeds into instruction sequence 487, in which the work interface then carries out the response to whatever command has been entered on the keyboard.

As stated above, if the command entered on the keyboard is DONE, the work interface program sends an END SESSION request to the work interface program and then terminates. If the command is not DONE, the program, after completing the instruction sequence 487 in response to the command, proceeds back into instruction sequence 485 to get the next command entered by the user and the process then repeats for each command entered by the user until the user enters the command DONE to terminate the active work session.[15]

[15] The source code listing for the work interface program is found in frames 78 to 118 in the microfiche appendix.

Figure 19:
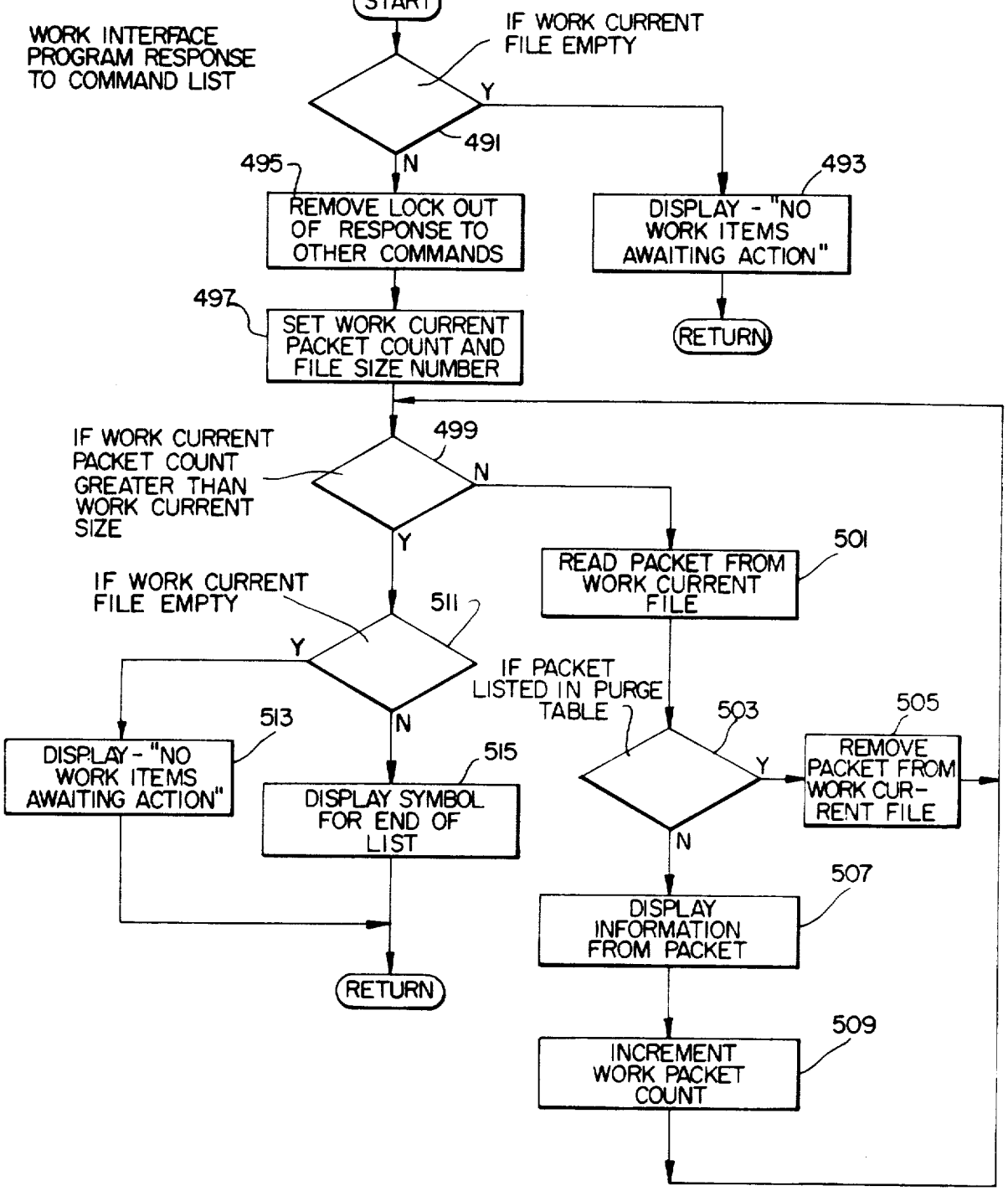
FIG. 19 is a flow chart of a subroutine forming part of the work interface program of FIG. 18 and carried out in response to a keyboard entered command LIST.

The details of the steps carried out by the work interface program to respond to the command LIST in instruction sequence 487 is illustrated by the flow chart of FIG. 19. When the command LIST has been received, the program first enters decision sequence 491, in which it is determined whether the work current file is empty. If the work current file is empty, the program branches to instruction sequence 493 in which it causes the CRT display of the work station to display "NO WORK ITEMS AWAITING ACTION" and then the program returns to instruction sequence 485, shown in FIG. 18.

If the work current file is not empty, the program proceeds into instruction sequence 495, in which the lock out of the response to the work interface program to the commands SELECT and COMPLETE is removed by clearing the list switch. The program then proceeds into instruction sequence 497 in which a count, referred to as the work current packet count, is set to zero and a number referred to as the "work current file size" is set equal to the number of packets in the work current file. The program then proceeds into decision sequence 499, in which it is determined whether the work current packet count is greater than the work current file size. If it is not, the program branches into instruction sequence 501, in which the event packet pointed to by the work current packet count is read from the work current file into a buffer register called the packet buffer. The program then proceeds into instruction sequence 503, in which it is determined whether the packet in the packet buffer is listed in the purge table. If it is, the program branches to instruction sequence 505 in which the packet is removed from the work current file. In this instruction sequence, the value of the work current file size is decremented by one. Because the work current file is a ring file, the removal of the event packet from the work current file in instruction sequence 505 will cause the work current packet count to now point to the next event packet after the one just removed. Following instruction sequence 505, the program proceeds back into decision sequence 499 and the process again iterates through sequences 501 and 503 if the work current packet count is still not greater than the work current file size. If in decision sequence 503 it is determined that the packet in the packet buffer is not listed in the purge table, the program proceeds to instruction sequence 507, in which a summary of the information in the event is displayed in the CRT display along with the sequence number identifying the event packet in the work current file. The displayed summary will include the effort identification, the document type, the event action, the dispatched time, and the estimated number of days for completion of the event packet. The program then proceeds into instruction sequence 509, in which the work current packet count is incremented and the process returns to decision sequence 499 to be repeated for the next event packet. When all of the event packets have been read out to the packet buffer and processed in sequences 503 and 505 or 507, all of the packets listed in the purge table will have been removed from the work current file and a summary of all of the packets in the work current file which were not removed will be displayed as a list by the CRT display. When all of the event packets in the work current file have been processed, the work current packet count will become greater than the work current file size. Upon determining this fact in decision sequence 499, the program proceeds into decision sequence 511, in which a determination is again made as to whether or not the work current file is empty. The work current file could have become empty as a result of the removal of one or more packets in instruction sequence 505. If the work current file is empty, the program branches into instruction sequence 513, in which it causes the CRT display device at the work terminal to display "NO WORK ITEMS AWAITING ACTION". If the work current file is not empty, the program proceeds from decision sequence 511 into instruction sequence 515, in which the symbol for the end of the list is displayed by the CRT display.

From instruction sequence 513, or 515, the work interface program exits from the response to the command LIST and returns to instruction sequence 485, as shown in FIG. 18.

The work interface program instruction sequence in response to the command SHOW in the instruction sequence 487 is illustrated by the flow chart of FIG. 20. As shown in FIG. 20, the program in response to receiving the command SHOW from the keyboard enters the decision sequence 521, in which it is determined whether or not the work current file is empty. If the work current file is empty, the program branches to instruction sequence 523, which causes "NO WORK ITEMS AWAITING ACTION" to be displayed by the CRT display device of the work terminal. The program then returns to instruction sequence 485 of the work interface program shown in FIG. 18. If the work current file is not empty, the program proceeds from decision sequence 521 into instruction sequence 525, in which the sequence number of the selected event packet, as shown in the displayed list produced in response to the command LIST, is obtained as entered from the keyboard. The program then enters instruction sequence 526, in which the selected event packet is read from the work current file to the packet buffer. The program then proceeds into instruction sequence 527, in which the complete information from the event packet in the packet buffer is displayed on the CRT display device. This includes the sequence number in the work current file, the effort identification, the event number in the effort RO file, the condition of the status flags, the individual who is to carry out the task of the event, the action to be taken, the document name, the document type, the number of days required for completion of the task, the date the event packet was dispatched, the date the item was first selected if the item has been selected, identification of the fields to be completed if the document type is a form, and any comments included with the event packet. If the event packet has been selected, then "NEVER SELECTED" is displayed instead of the time the event packet was first selected. After completion of the instruction sequence 527, the program returns to the instruction sequence 485, shown in FIG. 18.

When the command entered by the keyboard in instruction sequence 487 of the work interface program is SELECT, the response of the work interface program will follow the flow chart illustrated in FIG. 21. As shown in FIG. 21, the program first enters decision sequence 531, in which it is determined whether the work current file is empty. If it is, the program branches to instruction sequence 533, in which the CRT display of the work station is caused to display "NO WORK ITEMS AWAITING ACTION." If the work current file is not empty, then the program proceeds from the decision sequence 531 into decision sequence 535, in which it is determined whether or not the SELECT command is locked out as indicated by the condition of the list switch. If the list switch is set, the program branches to instruction sequence 537, in which the CRT display of the remote terminal is caused to display "YOU MUST FIRST SELECT LIST TO DETERMINE WORK ELEMENT NUMBERS" and the program then returns to instruction sequence 485, as shown in FIG. 18, to get the next user command. If the SELECT command is not locked out, that is, the list switch is clear, the program proceeds from decision sequence 535 into instruction sequence 539, in which the sequence number of the selected event packet is obtained as entered by the keyboard and the program then proceeds into instruction sequence 541. In instruction sequence 541, the program reads the selected event packet to the packet buffer and the program proceeds into decision sequence 543, in which it is determined whether or not the event packet in the packet buffer has already been selected or not. If the event packet has not already been selected, the program branches into decision sequence 545, in which the request SELECT identifying the event packet in the packet buffer is transmitted to the work daemon at the central processor. As has been explained above, the request monitor process, in response to the request SELECT, will cause any existing document of the event action to be borrowed or copied from the central library facility and stored in the document directory of the work station processor. The program then proceeds into instruction sequence 547 in which the selected flag in the event packet is set and the current time is entered in the time selected slot of the event packet. The updated event packet is then written back in the work current file in instruction sequence 549 and the program proceeds into instruction sequence 551, in which the document of the event packet will be read out from the document directory and displayed by the CRT display at the work station and the tool to carry out the event action will automatically be invoked. If the event document is a text, and the event action is CREATE or UPDATE, then the instruction sequence 551 will invoke the text editing tool. If the event document is a graph and the event action is UPDATE or CREATE, then the instruction sequence 551 will automatically invoke the graph editing tool. If the event document is a form and the event action is UPDATE or CREATE, then the instruction sequence 551 will automatically invoke the forms editing tool. For all three types of documents, if the event action is SIGN, then the instruction sequence 551 will initiate the electronics signature program, in which the user can apply an electronic signature to the document signifying his approval to the document or a portion thereof. If the event action is COMMENT, then for all three types of documents, the document displayed will be the document identified in the event packet and the text editor will be invoked to enter comments on the comments file for the effort which will have been transmitted from the central library facility to the document directory in the work station processor memory in response to the SELECT request sent to the work daemon in instruction sequence 545. If the event action is EXAMINE, then the instruction sequence 551 will merely display the document of the action stored in the special document subdirectory set up in the work station processor. The program will remain with the tool invoked in instruction sequence 551 until the user indicates that he has completed the use of the tool by entering another command whereupon the program will return to instruction sequence 485, as shown in FIG. 18.

The details of the steps carried out by the work interface program in response to the request COMPLETE in instruction sequence 487 is illustrated by the flow chart of FIG. 22. When the command COMPLETE has been received, the program enters decision sequence 561, in which it is determined if the command COMPLETE is locked out by the list switch being set. If the command COMPLETE has been locked out, the program branches to instruction sequence 563, in which the CRT display of the remote terminal is caused to display "YOU MUST FIRST SELECT LIST TO DETERMINE WORK ELEMENT NUMBERS". If the command COMPLETE is not locked out, the program proceeds to instruction sequence 565, in which the sequence number of the event packet entered by the keyboard of the work station is obtained. Then, in instruction sequence 567, the program reads the event packet selected by the keyboard entry from the work current file into the packet buffer and proceeds into instruction sequence 569, in which the program sends a COMPLETE request to the work daemon at the central data processor identifying the event packet in the packet buffer. Following instruction sequence 569, the program in instruction sequence 571 removes the event packet from the work current file and then in instruction sequence 573 displays "ITEM HAS BEEN COMPLETED" on the CRT display device at the work station terminal. The program then returns to instruction sequence 485 to get the next user command.

If the command entered on the keyboard is any of the administrative type commands ADMIN START, ADMIN STOP, ADMIN TRACE, or ADMIN CANCEL, then the program in instruction sequence 487 first checks the authority of the user who entered the command to make an administrative command. The details of the steps to make this authority check are illustrated by the flow chart of FIG. 23. As shown in FIG. 23, when any one of the administrative type commands have been received, the program first enters instruction sequence 581, in which a TRACE request is sent to the work daemon at the central data processor 11. The TRACE request wil identify the effort entered in the keyboard with the command and will have TRACE TIMES 1 and 2 both set to zero. In response to receiving this TRACE request, as explained above, the trace server subprocess will send back a copy of the first event packet in the effort RO file identified by the TRACE request. After completion of instruction sequence 581, the program proceeds into decision sequence 583 in which the effort manager named in the event packet sent back in response to the TRACE request is compared with the identification of the LOGIN of the user. If the identifications are not the same, the program branches into instruction sequence 585, which causes the CRT display display device at the work terminal to display "ADMIN PRIVILEGES DENIED" and the program returns to instruction sequence 485 of the work interface program, as shown in FIG. 18, without responding any further to the administrative command. If the identification of the effort manager is the same as the LOGIN identification of the user, the program proceeds into instruction sequence 587 and then carries out the response called for in the administrative type command.

As explained above, if the administrative command is ADMIN START, the response is the sending a COMPLETE request to the work daemon identifying the start packet of the effort RO file in accordance with the keyboard entry accompanying the command ADMIN START. If the request is ADMIN STOP, then the program in instruction sequence 587 will send out a STOP request identifying the effort to be stopped in accordance with the keyboard entry accompanying the command. If the request is ADMIN CANCEL, then the program in instruction sequence 587 will send out a CANCEL request to the work daemon identifying the effort to be cancelled in accordance with the keyboard entry accompanying the command.

If the command is ADMIN TRACE, then the program performs a sequence of steps, as illustrated in the flow chart of FIG. 24, in instruction sequence 587 of FIG. 22. As shown in FIG. 24, the program first enters instruction sequence 591 in which the question "CURRENT TRANSACTION ONLY?" is caused to be displayed on the cathode ray tube display device. To this question, the user may enter by means of the keyboard "YES" or "NO". If the user enters the response "YES" on the keyboard, the program branches into instruction sequence 595, in which TRACE TIME 1 is set to zero, TRACE TIME 2 is set to the current time and the TRACE request with these trace times is transmitted to the work daemon. The program then proceeds into instruction sequence 597, in which it receives the packet transmitted by the request monitor server subprocess and stores a summary of the packet in a file set up for this purpose. If in decision sequence 593, the user responds "NO", the program proceeds into instruction sequence 599, in which the cathode ray tube display device is caused to display the question "TRACE FROM BEGINNING OF EFFORT?" to prompt the user to respond to the queştion "YES" or "NO". If the user responds "YES", then the program in decision sequence 601 branches to instruction sequence 603, in which trace time 1 is set to "1" and trace time 2 is set to the current time and a TRACE request with these trace times is transmitted to the work daemon. The program then proceeds into instruction sequence 597, in which it will receive the event packets transmitted by the request monitor server subprocess in response to the TRACE request and store a summary of the packets in the file set up for this purpose. If in decision sequence 601, the user responds "NO", the program proceeds into decision sequence 607, in which the user is prompted to enter the beginning and ending times of the time window for which the user wants the trace report. The program then proceeds into instruction sequence 609, in which the beginning time entered by the user is set as TRACE TIME 1 and the ending time entered by the user is set as TRACE TIME 2 and the program sends a TRACE request with these TRACE TIMES to the work daemon. After completing instruction sequence 609, the program proceeds into instruction sequence 597, in which it receives the packets transmitted by the work daemon and stores a summary of the packets in a file set aside for this purpose in the memory of the work station processor. After the summary of the packets has been stored in the packet summary file, the user can then obtain the information from this file by accessing them in a conventional manner using his keyboard. After completing instruction sequence 597, the program returns to instruction sequence 485 to respond to the next command to be entered by the user.

In the system, as described above, each user, when he enters his LOGIN identification on the keyboard terminal, will receive a signal indicating whether he has received new work assignments in the form of event packets being sent to his work new file. Such event packets will be sent to his work new file only when the corresponding work events are ready to be worked on; that is, when all of the other work events which must be first completed have been completed. In response to the user entering the command LIST on his keyboard, there will be displayed to the user a summary of all of the work events which are ready for the user to work on. In response to the user entering the command SE- LECT identifying a particular work event, the document of the selected WORK event will be displayed to the user and the tool for carrying out the task of the work event will be automatically invoked. When the task of the work event has been completed and the user enters the command COMPLETE, the document of the event packet if modified or created by the task of the event packet will be stored in the central library facility replacing any preexisting document for the work event. In addition, the user's entry of the command COMPLETE will cause dispatching of any additional work events which were awaiting completion of the now completed work event to the appropriate user thus notifying the user when he enters his LOGIN that new work events are now ready for him to work on. Because the computer system takes care of the transmitting and routing of the documents electronically and automatically when the user indicates that he is ready to begin a given work event, delays due to misrouting of documents are substantially eliminated. Because each user is notified immediately when he enters his LOGIN when he has additional work events ready to be carried out and the identification of those work events and the documents of those work events are instantly made available to the user, delays caused by given tasks having to await completion of preceeding tasks in a project are minimized. Because the documents are transmitted electronically when they are ready to be worked on, delays caused by the need of the transmission of documents from one place to another in carrying out the tasks of the project are substantially eliminated. In addition, the existence of the effort RO file containing a current record of the up-to-the-minute status of the work events of the project and the availability to the effort manager of the ADMIN TRACE command, by which he can obtain a report on the status of the effort, enable the effort manager to quickly identify any bottlenecks in the project so that he can take corrective action. As a result, the system provides a great improvement in the efficiency in the office procedure in carrying out projects involving multiple tasks on multiple documents by a large number of individuals.

In the above described system, a central processor is employed coacting with a plurality of work station processors, each having a plurality of work stations connected thereto and, in this form, the invention is used most advantageously. It will be appreciated that the invention in its broader aspects is applicable to a system involving only a single data processor with a plurality of work stations connected to the data processor or with only a single work station connected to the data processor. Also, while the invention is most advantageously used in projects involving paper work, such as the creation and modification of documents, the concept of the invention in its broader aspects is applicable to projects other than paper work tasks, in which case the feature of the invention employing electronic storage retrieval and display of documents by the central library facility would not be employed. These and many other modifications may be made to the above described specific embodiment without departing from the spirit and scope of the invention, which is defined in the appended claims.

What is claimed is:

1. A computer system for improving the efficiency in carrying out a project involving the creation or modification of the multiplicity of documents by a multiplicity of individuals comprising:

storage means to electronically store a schedule of a multiplicity of work events comprising a stored packet of data for each work event, each of said packets identifying (1) a document, (2) a task to be performed with respect to said document selected from a set of tasks including creation of the document and modification of an existing document, (3) the individual who is assigned the task to be performed on the document, (4) an indication of whether the work event corresponding to the packet is completed, and (5) whether or not the commencement of the work event corresponding to the packet must await the completion of a preceding work event in said schedule;

document storage means to electronically store existing documents identified in said stored packets of said schedule;

keyboard means to generate input signals representing data, display means to display data transmitted to said display means;

data control means (1) operable to process the data in said packets and cause said display means to display the identification of uncompleted work events in said schedule which do not await the completion of preceding uncompleted work events (2) responsive to input signals received from said keyboard means for selecting one of the work events identified by said display means to cause the document of the selected work event as stored in said document storage means to be displayed by said display means, and (3) responsive to input signals received from said keyboard means to modify or create the document of the selected work event and to store the document as modified or created in said document storage means.

2. A computer system as recited in claim 1, wherein said data control means is responsive to input signals from said keyboard means selecting a work event in said schedule and indicating that the work event is completed, to store an indication in the packet corresponding to the selected work event that the selected work event is completed.

3. A computer system as recited in claim 1, wherein said keyboard means and said display means comprises a plurality of data terminals each having a keyboard for generating signals representing data and a display device for displaying data transmitted to said terminal, said data control means operating in response to signals received from a keyboard of one of said terminals selecting one of said work events to cause the display device of said terminal to display the document of the selected work event.

4. A computer system as recited in claim 1, including a current work storage means for each of the individuals assigned a task in said schedule and operable to store packets of data transmitted thereto by said data control means, said data control means transmitting copies of packets in said schedule which do not await completion of an uncompleted preceeding work event in said schedule to the current work storage means of the individual assigned the task of such work event, said data control means responding to input signals from said keyboard means identifying one of said individuals and indicating a request for a list of work events ready to be worked on causing said display means to display the identification of each of the work events corresponding to the packets in the current work storage means of the individual identified by the input signals from said keyboard means.

5. A computer system as recited in claim 4, wherein said data control means stores the current time in each data packet in said schedule when said data control means transmits a copy of such data packet to the current work storage means of the individual assigned the task of such work event, said computer system including further storage means to store data from said packets, said data control means being responsive to input signals from said keyboard indicating a request for status information on said project to store in said further storage means data from at least one packet of said schedule selected in accordance with the times stored in said packets.

6. A system for facilitating the carrying out of a project involving the performance of multiple tasks to be performed by a multiplicity of persons wherein some of said tasks must await completion of other of said tasks, said system comprising:

information storage means storing a schedule of work events comprising a packet of data for each work event, each stored packet including:
 (1) the identification of the task to be performed;
 (2) the identification of the person responsible for performing the task; and
 (3) whether the work event corresponding to the packet must await the completion of a preceeding work event in said schedule; and
 (4) an indication of whether the work event has been completed;
display means to display information in human readable form;
data control means operable to process the data in the stored packets of said schedule to determine which work events in said schedule do not await the completion of a preceeding uncompleted work event in said schedule and cause said display means to display the identification of the work events which have been determined not to await the completion of a preceeding uncompleted work event in said schedule.

7. A system as recited in claim 6, further comprising current work storage means for each of the individuals assigned a task in said work schedule operable to store packets of data transmitted thereto, said data control means transmitting each packet of data of said schedule corresponding to a work event determined as not awaiting completion of a preceeding uncompleted work event in said schedule to the current work storage means of the individual assigned the task of said work event, said display means including keyboard means associated therewith, said data control means responsive to input signals received from said keyboard means identifying an individual assigned a task in said schedule to cause said display means to display the identification of the work events corresponding to packets stored in the current work storage means of the individual identified by the signals received from said keyboard means.

8. A system as recited in claim 6, further comprising keyboard means for generating input signals representing data, said data control means being responsive to input signals received from said keyboard means selecting a work event in said schedule and indicating that the work event in said schedule is complete to store an indication in the packet corresponding to such work event in said schedule indicating that such work event is complete.

9. A system as recited in claim 6, wherein keyboard means is associated with said display means, wherein said computer system includes further storage means for storing data from said packets and wherein said data control means is responsive to signals received from said keyboard means indicating a request for a status report on said work schedule to process the data in the packets of said schedule and store data from selected packets of said schedule in said further storage means.

10. A computer system for improving the efficiency of office procedure in carrying out a project involving the performance of a multiplicity of tasks by a multiplicity of individuals wherein the commencements of some of the tasks of the project have to await completion of other preceding tasks of the project comprising:

a first data processing means having information storage means for storing a schedule of work events, comprising a stored packet of data for each work event, each stored packet including:
 (1) the identification of the task to be performed;
 (2) the identification of the person to perform the task;
 (3) an indication of whether the work event corresponding to the packet is completed; and
 (4) an indication of whether the commencement of the work event corresponding to the packet must await the completion of a preceeding work event in said schedule;
second data processing means;
transmission means interconnecting said second data processing means with said first data processing means for the transmission of data between said first data processing means and said second data processing means;
said first data processing means having data control means to process the data in the packets of said schedule and transmit over said transmission means to said second data processing means a copy of the packets in said schedule corresponding to work events which do not await the completion of an uncompleted preceding work event in said schedule;
said second data processing means having information storage means to store the packets transmitted thereto from said first data processing means over said transmission menas, display means connected to said second data processing means to display data in human readable form, said second data processing means including data control means operable to cause said display means to display the identification of the work events corresponding to packets stored in said information storage means of said second data processing means.

11. A computer system as recited in claim 10, wherein said second data processing means comprises a plurality of data processors, each having information storage means to store packets transmitted thereto from said first data processing means over said transmission means, said display means comprising at least one display device connected to each of said second data processors to display data in human readable form, each of said data processors having data control means operable to cause the display device connected thereto to display the identification of the work events corresponding to packets of data stored in the information storage means of such data processor.

12. A computer system as recited in claim 10, further comprising keyboard means connected to said second data processing means to generate input signals to said second data processing means, and wherein said data control means of said second data processing means operates to cause said display means to display the identification of selected work events corresponding to packets stored in the information storage means of said second data processing means in response to input signals received from said keyboard means.

13. A computer system as recited in claim 12, wherein said information storage means in said second data processing means includes a separate packet storage means for each individual assigned a task in said schedule of work events, the packets stored in the information storage means of said second data processing means each being stored in the packet storage means corresponding to the individual who is assigned the task of the work event corresponding to such packet, said data control means of said second data processing means operating in response to input signals received from said keyboard means including signals identifying an individual assigned a task in said schedule to cause said display means to display the identification of the work events corresponding to packets stored in the packet storage means of such individual.

14. A computer system as recited in claim 12, wherein the data control means of said second data processing means is responsive to input signals from said keyboard identifying one of the work events corresponding to a packet in the information storage means of said second data processing means and indicating that the work event corresponding to such data packet has been completed to remove such data packet from the information storage means of said second data processing means and to transmit a message to said first data processing means indicating that the work event identified by the input signals from said keyboard means has been completed, the data control means of said first data processing means being responsive to a message received from said second data processing means indicating that a work event has been completed to store an indication in the packet of said schedule corresponding to such work event indicating that the work event has been completed.

15. A system for facilitating the carrying out of a project involving the performance of multiple tasks to be performed by a multiplicity of individuals, said system comprising:
- a central data processor including information storage means to store a schedule of work events comprising a stored packet of data for each work event stored in said schedule, each packet including (1) the identification of one of said tasks, (2) the identification of the person responsible for performing the task, (3) an indication of whether the work event corresponding to the packet has been completed, and (4) whether the commencement of the work event corresponding to the packet must await the completion of a preceeding work event in said schedule,
- a plurality of second data processors,
- data transmission means connecting said second data processors to said central data processor to transmit data between said second data processors and said central data processor,
- said central data processor including data control means for proceessing the data in the stored packets of said schedule to determine which of said work events of said schedule do not await the completion of an uncompleted preceeeding work event in said schedule and to transmit the packets corresponding to work events determined not to await completion of an uncompleted preceding work event to said second data processors, each of said second data processors including information storage means to store the packets transmitted thereto by the data control means of said central data processor, a display means connected to each of said second data processors to display data transmitted thereto by the corresponding second data processor, each of said second data processors including data control means operable thereto by the corresponding second data processor, each of said second data processors including data control means operable to cause the display means connected thereto to display the identification of the work events corresponding to the packets stored in the information storage means of such second processor.

16. A method of operating a computer system to coordinate the creation and modification of a multiplicity of related documents, said computer system having a central processing unit and memory means to store data comprising:
(1) establishing in said memory means a schedule of work events, each work event being represented in said memory means by a stored packet of data identifying a document, a task to be performed with respect to said document selected from a set of tasks including creation and modification of said document, the individual who is assigned the task of the work event, and whether or not the work event must await completion of a preceding work event, and whether or not the work event has been completed;
(2) maintaining a file of the existing documents identified in said packets electronically stored in said memory means;
(3) initially setting the indication in each packet to indicate that the work event of such packet has not been completed,
(4) changing the indication in each packet to indicate that such work event has been completed when the task of such work event has been completed,
(5) displaying the documents of said work events to the respective individuals assigned the tasks of work events with the document for each packet which contains an indication that the corresponding work event must await the completion of a preceding work event being displayed to the individual assigned the task of such work event only after the indication in the packet corresponding to the preceding work event has been changed to indicate that such preceding work event has been completed,
(6) carrying out the tasks identified in the packets of the work events on the documents identified in the packets of the work events when the documents are displayed at the terminals, and
(7) after the completion of each work event electronically storing any document of such work event modified or created by the task of such work event in said file of existing documents.

* * * * *